(12) United States Patent
Yamada et al.

(10) Patent No.: US 11,601,246 B2
(45) Date of Patent: Mar. 7, 2023

(54) BASE STATION APPARATUS, TERMINAL APPARATUS, AND COMMUNICATION METHOD

(71) Applicants: SHARP KABUSHIKI KAISHA, Sakai (JP); FG Innovation Company Limited, Tuen Mun (HK)

(72) Inventors: Ryota Yamada, Sakai (JP); Hiromichi Tomeba, Sakai (JP)

(73) Assignees: FG Innovation Company Limited, Hong Kong (HK); Sharp Kabushiki Kaisha, Osaka (JP)

(*) Notice: Subject to any disclaimer, the term of this patent is extended or adjusted under 35 U.S.C. 154(b) by 46 days.

(21) Appl. No.: 17/172,215

(22) Filed: Feb. 10, 2021

(65) Prior Publication Data

US 2021/0167922 A1 Jun. 3, 2021

Related U.S. Application Data

(63) Continuation of application No. 16/342,373, filed as application No. PCT/JP2017/039720 on Nov. 2, 2017, now abandoned.

(30) Foreign Application Priority Data

Nov. 2, 2016 (JP) .................................. 2016-214930

(51) Int. Cl.
*H04L 5/00* (2006.01)
*H04L 27/26* (2006.01)
(Continued)

(52) U.S. Cl.
CPC ............ *H04L 5/0051* (2013.01); *H04L 5/001* (2013.01); *H04L 27/2613* (2013.01);
(Continued)

(58) Field of Classification Search
CPC ................... H04L 5/0051; H04L 5/001; H04L 27/2613; H04W 72/042; H04W 72/0446; H04W 88/02; H04W 88/08
See application file for complete search history.

(56) References Cited

U.S. PATENT DOCUMENTS

| 9,609,647 B2 | 3/2017 | You et al. |
| 10,171,225 B2 | 1/2019 | Horiuchi et al. |
| (Continued) | | |

FOREIGN PATENT DOCUMENTS

JP 2013511855 11/2009

OTHER PUBLICATIONS

"IMT Vision—Framework and overall objectives of the future development of IMT for 2020 and beyond", M Series-Mobile, radio determination, amateur and related satellite services, Recommendation ITU-RM.2083-0, Sep. 2015.
(Continued)

*Primary Examiner* — Melanie Jagannathan
(74) *Attorney, Agent, or Firm* — Imperium Patent Works

(57) ABSTRACT

A base station apparatus includes a downlink reference signal generation unit configured to generate a first demodulation reference signal and a second demodulation reference signal that are reference signals used to demodulate a data signal, and a radio transmitting unit configured to transmit the first demodulation reference signal, the second demodulation reference signal, and control information to the terminal apparatus. The control information includes parameters regarding the first demodulation reference signal and parameters regarding the second demodulation reference signal. The parameters regarding the first demodulation reference signal include an antenna port number. The parameters regarding the second demodulation reference signal include an antenna port number, and a time domain density
(Continued)

or a frequency domain density with which demodulation reference signals are mapped into a slot. The first demodulation reference signal is mapped before the second demodulation reference signal in the slot.

8 Claims, 12 Drawing Sheets

(51) Int. Cl.
    *H04W 72/04*     (2009.01)
    *H04W 88/02*     (2009.01)
    *H04W 88/08*     (2009.01)
    *H04W 72/0446*     (2023.01)

(52) U.S. Cl.
    CPC ..... *H04W 72/042* (2013.01); *H04W 72/0446* (2013.01); *H04W 88/02* (2013.01); *H04W 88/08* (2013.01)

(56) References Cited

U.S. PATENT DOCUMENTS

| | | | |
|---|---|---|---|
| 10,250,366 | B2 | 4/2019 | Kim et al. |
| 10,547,427 | B2 | 1/2020 | Hwang et al. |
| 2012/0207119 | A1 | 8/2012 | Zhang et al. ................. 370/329 |
| 2013/0336282 | A1 | 12/2013 | Nakano et al. ................ 370/330 |
| 2016/0037491 | A1 | 2/2016 | Hwang et al. ................ 370/330 |
| 2017/0366377 | A1 | 12/2017 | Papasakeliariou |
| 2017/0374675 | A1 | 12/2017 | Hwang et al. |
| 2018/0063865 | A1* | 3/2018 | Islam ................ H04W 72/1289 |
| 2018/0084593 | A1* | 3/2018 | Chen ................. H04L 27/26025 |
| 2018/0091267 | A1* | 3/2018 | Kim .................. H04L 27/26025 |
| 2018/0091350 | A1* | 3/2018 | Akkarakaran ........ H04L 5/0053 |
| 2018/0176058 | A1 | 6/2018 | Kim et al. |
| 2018/0212733 | A1 | 7/2018 | Khoryaev et al. |
| 2019/0007152 | A1* | 1/2019 | Yi .......................... H04L 5/0028 |
| 2019/0068352 | A1 | 2/2019 | Xiong et al. |
| 2019/0123864 | A1* | 4/2019 | Zhang .................... H04B 7/088 |
| 2019/0174440 | A1* | 6/2019 | Kwak ............... H04W 56/0015 |
| 2020/0008228 | A1* | 1/2020 | Lee .................... H04W 72/1284 |
| 2020/0028640 | A1* | 1/2020 | Yeo ...................... H04L 5/0007 |
| 2020/0059337 | A1 | 2/2020 | Yamada et al. |
| 2022/0030521 | A1* | 1/2022 | Cirik .................... H04L 5/0048 |

OTHER PUBLICATIONS

Ericsson, "Frame structure and DMRS positions", R1-1609768, 3GPP TSG-RAN WG1 #86bis, Lisbon, Portugal, Oct. 10-14, 2016.

* cited by examiner

BASE STATION APPARATUS, TERMINAL APPARATUS, AND COMMUNICATION METHOD

CROSS REFERENCE TO RELATED APPLICATIONS

This application is a continuation, and claims priority under 35 U.S.C. § 120 from nonprovisional U.S. patent application Ser. No. 16/342,373, entitled "Base station apparatus, Terminal apparatus, and Communication Method", filed on Apr. 16, 2019, the subject matter of which is incorporated herein by reference. Application Ser. No. 16/342,373, in turn, is a 371 of PCT/JP2017/039720, filed on Nov. 2, 2017, the subject matter of which is incorporated herein by reference. This application claims priority under 35 U.S.C. § 119 from Japanese patent application serial number JP 2016-214930, filed on Nov. 2, 2016, the subject matter of which is incorporated herein by reference.

TECHNICAL FIELD

The present invention relates to a base station apparatus, a terminal apparatus, and a communication method.

BACKGROUND

In a communication system such as Long Term Evolution (LTE) or LTE-Advanced (LTE-A) standardized by the Third Generation Partnership Project (3GPP), the communication area can be widened by forming a cellular configuration in which multiple areas, covered by base station apparatuses (base stations, transmission stations, transmission points, downlink transmission devices, uplink reception devices, a group of transmit antennas, a group of transmit antenna ports, component carriers, eNodeB, Access Point, and AP) or transmission stations equivalent to the base station apparatuses, are deployed in the form of multiple cells (Cells). A terminal apparatus (reception station, reception point, downlink reception apparatus, uplink transmission apparatus, receive antenna group, receive antenna port group, UE, station, and STA) is connected to the base station. In such a cellular configuration, frequency efficiency can be improved by using the same frequency among neighboring cells or sectors.

Research and development activities related to the 5th generation mobile radio communication system (5G system) have been actively carried out, aiming to start commercial services around the year 2020. A vision recommendation on the standard system of the 5G system (International mobile telecommunication—2020 and beyond: IMT-2020) was recently reported (see NPL 1) by the International Telecommunication Union Radio Communications Sector (ITU-R), which is an international standardization body.

The 5G system assumes that a radio access network is operated by combining various frequency bands to satisfy various requirements represented by three large use scenarios (Enhanced mobile broadband (EMBB), Enhanced Massive machine type communication (eMTC), and Ultra-reliable and low latency communication (URLLC)). Thus, unlike the known LTE/LTE-A, it is assumed that the 5G system uses multiple frame formats with different radio parameters (subcarrier spacings and the like) although the 5G system has the same access scheme as LTE/LTE-A.

However, it is assumed that the multiple frame formats involve respective suitable communication schemes and communication methods. The 5G system needs to be a system for integrating the frame formats together, with communications suitable for the respective frame formats maintained.

A solution is sought.

SUMMARY

An object of the present invention is to provide a base station apparatus, a terminal apparatus, and a communication method that are capable of improving communication performance such as throughput and communication efficiency in a system using multiple frame formats. To address the above-mentioned drawbacks, a base station apparatus, a terminal apparatus, and a communication method according to an aspect of the present invention are configured as follows.

According to an aspect of the present invention, a base station apparatus for communicating with a terminal apparatus is provided, the base station apparatus including a downlink reference signal generation unit configured to generate a first demodulation reference signal and a second demodulation reference signal that are reference signals used to demodulate a data signal, and a radio transmitting unit configured to transmit the first demodulation reference signal, the second demodulation reference signal, and control information to the terminal apparatus, wherein the control information includes parameters regarding the first demodulation reference signal and parameters regarding the second demodulation reference signal, the parameters regarding the first demodulation reference signal include an antenna port number, the parameters regarding the second demodulation reference signal include an antenna port number, and a time domain density or a frequency domain density with which demodulation reference signals are mapped into a slot, and the first demodulation reference signal is mapped before the second demodulation reference signal in a slot.

Furthermore, in the base station apparatus according to an aspect of the present invention, a spatial multiplexing order supported for the first demodulation reference signal is lower than a spatial multiplexing order supported for the second demodulation reference signal.

Furthermore, in the base station apparatus according to an aspect of the present invention, the first demodulation reference signal is mapped in a fixed mapping pattern for each carrier frequency range.

Furthermore, in the base station apparatus according to an aspect of the present invention, the first demodulation reference signal is mapped to all subcarriers of the slot in one of the carrier frequency ranges.

Furthermore, in the base station apparatus according to an aspect of the present invention, the frequency domain density for the first demodulation reference signal is higher than the frequency domain density for the second demodulation reference signal, and the time domain density for the first demodulation reference signal is lower than the time domain density for the second demodulation reference signal.

According to an aspect of the present invention, a terminal apparatus for communicating with a base station apparatus is provided, the terminal apparatus including a radio receiving unit configured to receive, from the base station apparatus, a first demodulation reference signal and a second demodulation reference signal that are reference signals used to demodulate a data signal, the data signal, and control information, and a signal detection unit configured to demodulate the data signal by using the first demodulation reference signal and the second demodulation reference signal, wherein the control information include parameters regarding the first demodulation reference signal and parameters regarding the second demodulation reference signal, the parameters regarding the first demodulation reference signal include an antenna port number, the parameters regarding the second demodulation reference signal include an antenna port number, and a time domain density or a frequency domain density with which demodulation reference signals are mapped into a slot, and the first demodulation reference signal is mapped before the second demodulation reference signal in a slot.

Furthermore, in the terminal apparatus according to an aspect of the present invention, a spatial multiplexing order supported for the first demodulation reference signal is lower than a spatial multiplexing order supported for the second demodulation reference signal.

Furthermore, in the terminal apparatus according to an aspect of the present invention, the first demodulation reference signal is mapped in a fixed mapping pattern for each carrier frequency range.

Furthermore, in the terminal apparatus according to an aspect of the present invention, the first demodulation reference signal is mapped to all subcarriers of the slot in one of the carrier frequency ranges.

Furthermore, in the terminal apparatus according to an aspect of the present invention, the frequency domain density for the first demodulation reference signal is higher than the frequency domain density for the second demodulation reference signal, and the time domain density for the first demodulation reference signal is lower than the time domain density for the second demodulation reference signal.

According to an aspect of the present invention, a communication method in a base station apparatus for communicating with a terminal apparatus is provided, the communication method including a downlink reference signal generation step of generating a first demodulation reference signal and a second demodulation reference signal that are reference signals used to demodulate a data signal, and a radio transmission step of transmitting the first demodulation reference signal, the second demodulation reference signal, and control information to the terminal apparatus, wherein the control information includes parameters regarding the first demodulation reference signal and parameters regarding the second demodulation reference signal, the parameters regarding the first demodulation reference signal include an antenna port number, the parameters regarding the second demodulation reference signal include an antenna port number, and a time domain density or a frequency domain density with which demodulation reference signals are mapped into a slot, and the first demodulation reference signal is mapped before the second demodulation reference signal in the slot.

According to an aspect of the present invention, a communication method in a terminal apparatus for communicating with a base station apparatus is provided, the communication method including a radio receiving step of receiving, from the base station apparatus, a first demodulation reference signal and a second demodulation reference signal that are reference signals used to demodulate a data signal, the data signal, and control information, and a signal detection step of demodulating the data signal by using the first demodulation reference signal and the second demodulation reference signal, wherein the control information includes parameters regarding the first demodulation reference signal and parameters regarding the second demodulation reference signal, the parameters regarding the first demodulation reference signal include an antenna port number, the parameters regarding the second demodulation reference signal include an antenna port number, and a time domain density or a frequency domain density with which demodulation reference signals are mapped into a slot, and the first demodulation reference signal is mapped before the second demodulation reference signal in the slot.

According to an aspect of the present invention, communication performance can be improved in a system using multiple frame formats. Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. A communication system according to the present embodiment includes a base station apparatus (a transmitter, cells, a transmission point, a group of transmit antennas, a group of transmit antenna ports, component carriers, and eNodeB) and terminal apparatuses (a terminal, a mobile terminal, a reception point, a reception terminal, a receiver, a group of receive antennas, a group of receive antenna ports, and UE). Furthermore, a base station apparatus connected to a terminal apparatus (base station apparatus that establishes a radio link with a terminal apparatus) is referred to as a serving cell The base station apparatus and the terminal apparatus in the present embodiment can communicate in a licensed band and/or an unlicensed band.

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
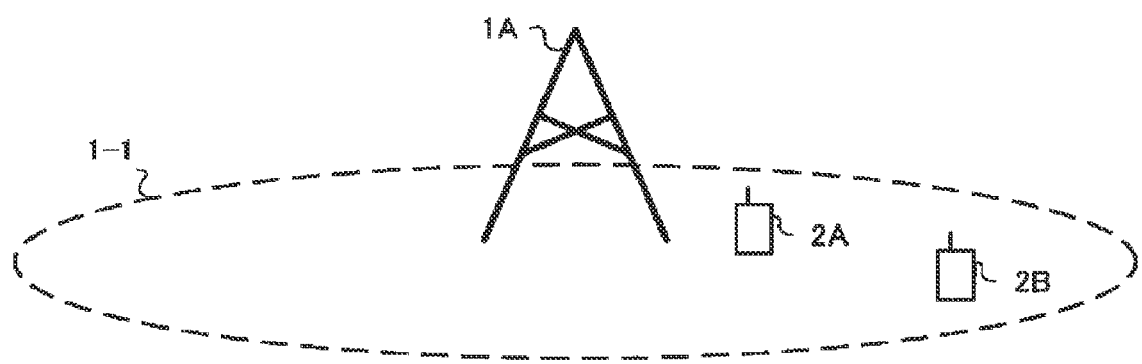
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (a communication area) in which the base station apparatus 1A can connect to the terminal apparatuses. The terminal apparatuses 2A and 2B are also collectively referred to as terminal apparatuses 2.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared CHannel (UL-SCH) resource. The Channel State Information refers to a Rank Indicator (RI) for specifying a suited spatial multiplexing number, a Precoding Matrix Indicator (PMI) for specifying a suited precoder, a Channel Quality Indicator (CQI) for specifying a suited transmission rate, a CSI-Reference Signal (RS) Resource Indication (CRI) for specifying a suited CSI-RS resource, and the like.

The Channel Quality Indicator (hereinafter, referred to as a CQI value) can be a suited modulation scheme (e.g., QPSK, 16QAM, 64QAM, 256QAM, or the like) and a suited coding rate in a prescribed band (details of which will be described later). The CQI value can be an index (CQI Index) determined by the above change scheme, coding rate, and the like. The CQI value can take a value predetermined in the system.

Note that the Rank Indicator and the Precoding Quality Indicator can take the values predetermined in the system. The Rank Indicator and the Precoding Matrix Indicator can be an index determined by the number of spatial multiplexing and Precoding Matrix information. Note that values of the Rank Indicator, the Precoding Matrix Indicator, and the Channel Quality Indicator are collectively referred to as CSI values.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the uplink control information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

PRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a DeModulation Reference Signal (DMRS) and a Sounding Reference Signal (SRS).

DMRS is associated with transmission of PUSCH or PUCCH. For example, the base station apparatus 1A uses DMRS in order to perform channel compensation of PUSCH or PUCCH. SRS is not associated with the transmission of PUSCH or PUCCH. For example, the base station apparatus 1A uses SRS to measure an uplink channel state.

In FIG. 1, the following downlink physical channels are used for the downlink radio communication from the base station apparatus 1A to the terminal apparatus 2A. The downlink physical channels are used for transmitting information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

PBCH is used for broadcasting a Master Information Block (MIB, a Broadcast CHannel (BCH)) that is shared by the terminal apparatuses. PCFICH is used for transmission of information for indicating a region (e.g., the number of Orthogonal Frequency Division Multiplexing (OFDM) symbols) to be used for transmission of PDCCH.

PHICH is used for transmission of ACK/NACK with respect to uplink data (a transport block, a codeword) received by the base station apparatus 1A. In other words, PHICH is used for transmission of a HARQ indicator (HARQ feedback) for indicating ACK/NACK with respect to the uplink data. Note that ACK/NACK is also called HARQ-ACK. The terminal apparatus 2A reports ACK/NACK having been received to a higher layer. ACK/NACK refers to ACK for indicating a successful reception, NACK for indicating an unsuccessful reception, and DTX for indicating that no corresponding data is present. In a case that PHICH for uplink data is not present, the terminal apparatus 2A reports ACK to a higher layer.

The PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a TPC command for PUCCH. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

Furthermore, the DCI format for the uplink can be used to request Channel State Information (CSI; also referred to as reception quality information) for the downlink (CSI request).

The DCI format for the uplink can be used for a configuration for indicating an uplink resource to which a CSI feedback report is mapped, the CSI feedback report being fed back to the base station apparatus by the terminal apparatus. For example, the CSI feedback report can be used for a configuration for indicating an uplink resource that periodically reports Channel State Information (periodic CSI). The CSI feedback report can be used for a mode configuration (CSI report mode) for periodically reporting the Channel State Information.

For example, the CSI feedback report can be used for a configuration for indicating an uplink resource that reports aperiodic Channel State Information (aperiodic CSI). The CSI feedback report can be used for a mode configuration (CSI report mode) for aperiodically reporting the Channel State Information. The base station apparatus can configure any one of the periodic CSI feedback report and the aperiodic CSI feedback report. In addition, the base station apparatus can configure both the periodic CSI feedback report and the aperiodic CSI feedback report.

The DCI format for the uplink can be used for a configuration for indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information on the scheduled PUSCH.

PDSCH is used to transmit downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user equipment specific information (unique to user equipment) is transmitted by using a message dedicated to the given terminal apparatus. PDSCH is used to transmit MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration for indicating an uplink resource that periodically reports Channel State Information (periodic CSI). The CSI feedback report can be used for a mode configuration (CSI report mode) for periodically reporting the Channel State Information.

The type of the downlink Channel State Information report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS) relating to PDSCH, a DeModulation Reference Signal (DMRS) relating to EPDCCH, a Non-Zero Power Channel State Information-Reference Signal (NZP CSI-RS), and a Zero Power Chanel State Information-Reference Signal (ZP CSI-RS).

CRS is transmitted in an entire band of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. The terminal apparatus 2A performs signal measurement (channel measurement) by using NZP CSI-RS. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in an entire band of the subframe used for transmitting PMCH. MBSFN RS is used to demodulate PMCH. PMCH is transmitted through the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are collectively referred to as a physical channel. The downlink physical signal and the uplink physical signal are also collectively referred to as a physical signal.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing or the like is performed for each codeword.

Furthermore, for terminal apparatuses that support Carrier Aggregation (CA), the base station apparatus can integrate multiple Component Carriers (CCs) for transmission in a broader band to perform communication. In carrier aggregation, one Primary Cell (PCell) and one or more Secondary Cells (SCells) are configured as a set of serving cells.

Furthermore, in Dual Connectivity (DC), a Master Cell Group (MCG) and a Secondary Cell Group (SCG) are configured as a group of serving cells. MCG includes a PCell and optionally one or more SCells. Furthermore, SCG includes a primary SCell (PSCell) and optionally one or more SCells.

The base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes. Furthermore, the subframe includes multiple OFDM symbols, thus the subframe length can be expressed in the number of OFDM symbols. For example, the subframe can be expressed in the number of OFDM symbols at a reference subcarrier spacing (for example, 15 kHz). For example, the number of OFDM symbols for indicating the subframe length can be 14. Furthermore, the subframe includes multiple slots. The slot is expressed in the number of OFDM symbols at a subcarrier spacing used for transmission. The number of OFDM symbols of the slot may be associated with the number of OFDM symbols of the subframe. For example, the number of OFDM symbols of the slot can be the same as or half of the number of OFDM symbols of the subframe. For example, the slot includes 7 or 14 OFDM symbols. Furthermore, the number of OFDM symbols constituting the slot may vary according to the subcarrier spacing. For example, in a case of a subcarrier spacing of 60 kHz or higher, the slot includes 14 OFDM symbols. In the description below, the subframe length, in a case of being expressed in time, is 1 ms. However, the aspect of the present invention is not limited to this. Furthermore, the subframe/slot can include an uplink period during which an uplink signal/channel is communicated and a downlink period during which a downlink signal/channel is communicated. In other words, the subframe/slot may include only an uplink period, only a downlink period, or an uplink period and a downlink period. Furthermore, the subframe/slot can include a guard period (null period). Note that a position at which the guard period can be allocated and/or a guard period length may be fixed or configured by the base station apparatus. Furthermore, a configurable period length may vary depending on whether the guard period is allocated before or after the subframe/slot. Furthermore, the period lengths may be fixed for a subframe/slot including an uplink period, a downlink period, and a guard period, depending on the allocation of the periods. Furthermore, the base station apparatus can configure, in a higher layer, the allocation and the period lengths of the uplink period/downlink period/guard period in the subframe/slot, and transmit, to the terminal, the allocation and the period lengths included in control information. Furthermore, the base station apparatus can be configured for each subframe/slot or each subframe group. Furthermore, a minislot shorter than the slot may be defined. The subframe/slot/minislot can be used as a scheduling unit. For example, in a case that the slot is 14 OFDM symbols, the minislot may be 2, 4, or 7 OFDM symbols. Furthermore, for example, in a case that the slot is 7 OFDM symbols, the minislot is 4 or 7 OFDM symbols.

The subframe/slot includes one or more OFDM symbols. In the embodiments below, it is assumed that the OFDM symbol refers to a symbol generated based on Inverse Fast Fourier Transform (IFFT), and that the OFDM signal refers to a OFDM symbol to which a guard period is added. Note that the guard period is a zero period (null period) or Cyclic Prefix (CP). Note that the guard period length may be zero.

Multiple parameters may be configured to generate OFDM symbols. The parameters include a subcarrier spacing and/or the number of Fast Fourier Transform (FFT) points. Furthermore, a base parameter is configured that is a basis for multiple parameters. Note that the base parameter is also referred to as a reference parameter. The parameters other than the base parameter can be determined based on the base parameter. For example, in a case that the base parameter is a subcarrier spacing of 15 kHz, the parameters other than the base parameter can each be N-times the subcarrier spacing of 15 kHz. Note that N is an integer or the m-th power of 2 or a fraction. Note that m is an integer and includes a negative number such as m=−2. Note that the N or m is referred to as a scale factor for the subcarrier spacing (parameter set). Furthermore, a parameter, such as a subcarrier spacing, that has a fixed value is referred to as a parameter set. In the embodiments described below, by way of example, a first parameter set is a subcarrier spacing of 15 kHz and a second parameter set is a subcarrier spacing of 30 kHz, unless otherwise noted. However, the aspect of the present invention is not limited to this. Furthermore, the number of parameter sets that can be configured by the base station apparatus is not limited to two. In the embodiments described below, the number of FFT points is the same between the first parameter set and the second parameter set, unless otherwise noted. In other words, the OFDM symbol length decreases as the subcarrier spacing increases. Furthermore, OFDM symbols generated by the first parameter set and the second parameter set are respectively referred to as first OFDM symbols and second OFDM symbols.

Furthermore, for a reduction in the adverse effect of phase noise or the like, the subcarrier spacing is desirably increased as the carrier frequency (band) becomes higher. Accordingly, the base station apparatus can configure a base parameter set by using a carrier frequency (band) or a carrier frequency range (band range). For example, a first frequency range (band range) covers carrier frequencies lower than 6 GHz, a second frequency range (band range) covers carrier frequencies higher than or equal to 6 GHz and lower than 40 GHz, and a third frequency range (band range) covers carrier frequencies higher than or equal to 40 GHz. In this case, the base station apparatus can configure the base parameter to be a subcarrier spacing of 15 kHz within the first carrier frequency range. The base station apparatus can also configure the base parameter to be a subcarrier spacing of 60 kHz within the second carrier frequency range. The base station apparatus can also configure the base parameter to be a subcarrier spacing of 240 kHz within the third carrier frequency range.

Furthermore, multiple types of CP lengths may be configured. Multiple types of CP lengths may also be configured for each parameter set. For example, two types of CP lengths are configured. Furthermore, the two types of CPs are respectively referred to as a first CP and a second CP. For the same parameter set, the second CP length is longer than the first CP length. Furthermore, the radio (overhead) of the first CP length and the second CP length to OFDM symbols can be almost the same for each parameter set. Note that the first CP is also referred to as a normal CP and the second CP is also referred to as an extended CP. Furthermore, an OFDM signal in which the first CP is added to the first OFDM symbol is referred to as a first OFDM signal-1, and an OFDM signal in which the second CP is added to the first OFDM symbol is referred to as a first OFDM signal-2. Furthermore, an OFDM signal in which the first CP is added to the second OFDM symbol is referred to as a second OFDM signal-1, and an OFDM signal in which the second CP is added to the second OFDM symbol is referred to as a second OFDM signal-2. Note that multiple CP lengths may not be configured in some parameter sets. Furthermore, the number of CP lengths configured may vary for each parameter set. Note that multiple CP lengths may be configured in a special parameter set. Note that, in the embodiments described above or below, OFDM symbols/signals are used even for description of the uplink (corresponding to a case where the terminal apparatus performs transmission) but that the OFDM symbols/signals include the meanings of OFDM symbols/signals and SC-FDMA symbols/signals unless otherwise noted. Furthermore, the parameter set and the CP length can each have the same configuration or different configurations for the downlink and the uplink. The terminal apparatus can demodulate downlink signals (OFDM signals) by using the parameter set and the CP length configured for the downlink and transmit uplink signals (OFDM signals and SC-FDMA signals) by using the parameter set and the CP length configured for the uplink. Note that the reference parameter may be common to the uplink and the downlink. In this case, the subframe lengths determined from the reference parameter are equal between the uplink and the downlink.

Note that the number of subframes/slots included in a prescribed time period can have the same value or different values between the uplink and the downlink. For example, the number of subframes/slots included in the prescribed time period in the downlink can be smaller than the number of subframes/slots included in the prescribed time period in the uplink and vice versa. The base station apparatus and the terminal apparatus included in the above-described communication system can provide a communication service with different requirements configured for the uplink and the downlink. The communication service is, for example, a communication service in which high-speed transmission such as video transmission is performed in the downlink, and low delay response to the video transmission is required in the uplink. In other words, a case is included where the subframe/slot length in the uplink needs to be configured to be smaller than the subframe/slot length in the downlink. Again, the present embodiment includes a case where the subframe/slot length in the downlink needs to be configured to be smaller than the subframe/slot length in the uplink.

Note that, in a case that part of the resources in the uplink or the downlink are used for transmission in another link (for example, a sidelink), the terminal apparatus can use, for the transmission in the sidelink, a parameter set and a CP length that are different from the parameter set and the CP length configured for the uplink transmission (or downlink transmission) using the part of the resources, or the parameter set and the CP length can be configured by the base station apparatus. Of course, the terminal apparatus can use, for the transmission in the sidelink, the same parameter set and CP length as those configured for the uplink transmission (or downlink transmission) using the part of the resources. Furthermore, a dedicated parameter set and a CP length for the sidelink can be configured in the terminal apparatus.

In the present embodiment, sizes in the time domain such as the frame length, symbol length, and CP length are expressed in basic time units Ts. Note that points represent the number of certain basic time units Ts unless otherwise noted. For example, in a case that CP is expressed in NCP points, the CP length is the product of NCP and Ts. Here, the basic time unit Ts can be determined from a subcarrier spacing and an FFT size (the number of FFT points). Here, in a case that the subcarrier spacing is represented as SCS and the number of FFT points is represented as NFFT, Ts=1/(SCS×NFFT) seconds (here, / means a division). Accordingly, in a case that the subcarrier spacing is multiplied by N with the number of FFT points remaining the same, the CP length is divided by N. Note that Ts may be, for example, a time unit based on reference parameters (subcarrier spacing and the number of FFT points) such as SCS=15 kHz and NFFT=2048 points. In this case, the basic time unit is Ts/N (here, / means a division) in a case that the subcarrier spacing is 15N kHz. Furthermore, in a case that NFFT is multiplied by N with SCS remaining the same, the basic time unit is Ts/N (here, / means a division).

Furthermore, with a common NFFT, the number of CP points can be common to all parameters except for some OFDM symbols. For example, the first CP can have 144 points and the second CP can have 512 points for the OFDM symbols other than the first symbol of 0.5 ms. Furthermore, with the same NFFT, the system bandwidth varies according to SCS. Note that such a system bandwidth determined by SCS is also referred to as a reference system bandwidth. For example, the reference system bandwidth can be 20 MHz in a case of SCS=15 kHz and 80 MHz in a case of SCS=60 kHz. In a case that the system bandwidth is the same for each SCS, NFFT is different for each SCS, Ts is kept the same by SCS, and the number of CP points varies according to SCS. Note that not all the parameter sets may follow a unified rule based on a variation in SCS, for example, multiplication by N. In other words, the overheads of the first CP/second CP may not be equal for all the parameter sets. For example, in a case that N is a fraction, the overhead of CP can be reduced. Furthermore, in a case that N is 4 or larger or the like, leading a large reference system bandwidth, the overhead of CP can be reduced. Note that a CP of which overhead is less than the first CP is referred to as a Shortened CP (SCP). Furthermore, the shortened CP is also referred to as a third CP. Note that the third CP may include a case of NCP=0. Note that a third CP having a zero length is also referred to as a zero CP. Furthermore, a signal in which the third CP is added to OFDM symbols is referred to as an OFDM signal-3. Note that the OFDM signal-3 may not be time-multiplexed with the OFDM signal-1 and the OFDM signal-2. Furthermore, the OFDM signal-3 may not be time-multiplexed/frequency-multiplexed with the OFDM signal-1 and the OFDM signal-2. Furthermore, in a case of adding the third CP, the base station apparatus can configure a CP length specific to the terminal apparatus (guard period length, zero period length, or null period length). In this case, the base station apparatus can transmit the third CP on a control channel commonly used within the cell and transmit the CP length specific to the terminal on a control channel specific to the terminal. Furthermore, the third CP may be configured only within a certain carrier frequency range.

In general, delay spread is similar at equivalent carrier frequencies regardless of the subcarrier spacing, thus the CP length desirably has a value at which the delay spread causes less adverse effect. Accordingly, the base station apparatus can configure a base (reference) CP length for each parameter set at the carrier frequency or within the carrier frequency range. For example, within the first carrier frequency range, the first CP can be the base CP for the first parameter set and the second CP can be the base CP for the second parameter set. Note that the delay spread is affected by coverage (transmit power) of the base station apparatus, a cell radius, a distance between the base station apparatus and the terminal apparatus, and the like, thus, at the same carrier frequency, varying the CP length for each base station apparatus/each terminal apparatus enables efficient communication. Accordingly, in the same subframe, the base station apparatus/terminal apparatus can multiplex, in the time domain/frequency domain, the OFDM symbols to which the first CP is added and the OFDM symbols to which the second CP is added. The base station apparatus/terminal apparatus can then transmit the resultant OFDM symbols. The OFDM symbols to which the first CP is added and the OFDM symbols to which the second CP is added may be the same parameter set or different parameter sets. Furthermore, in a case that the subframe is configured to be the number of OFDM symbols corresponding to the reference parameter (subcarrier spacing), the number of OFDM symbols may be determined with the first CP or the second CP taken into account. Furthermore, the first CP or the second CP, or the CP length may be included in the reference parameters.

Note that the parameter set supported by the terminal apparatus is reported to the base station apparatus as a function (capability) or a category of the terminal apparatus. Furthermore, information for indicating whether the first CP/second CP/third CP is supported at a certain subcarrier spacing can be included in the function (capability) or the category of the terminal apparatus. The information for indicating whether the first CP/second CP/third CP is supported can be indicated for each band or for each band combination. The base station apparatus can transmit a transmit signal with the parameter set or the CP length supported by the terminal apparatus, based on the function (capability) or the category of the terminal apparatus received from the terminal apparatus.

Figure 2:
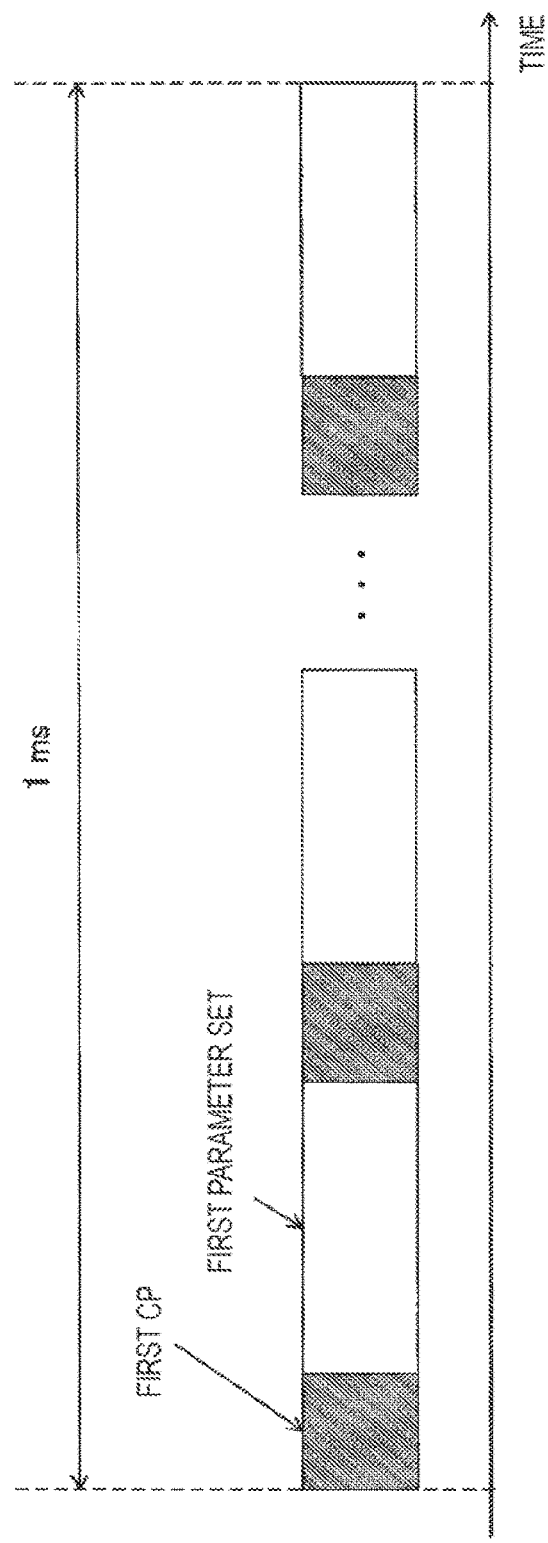
FIG. 2 is a diagram illustrating an example of a frame structure according to the present embodiment.
Figure 3:
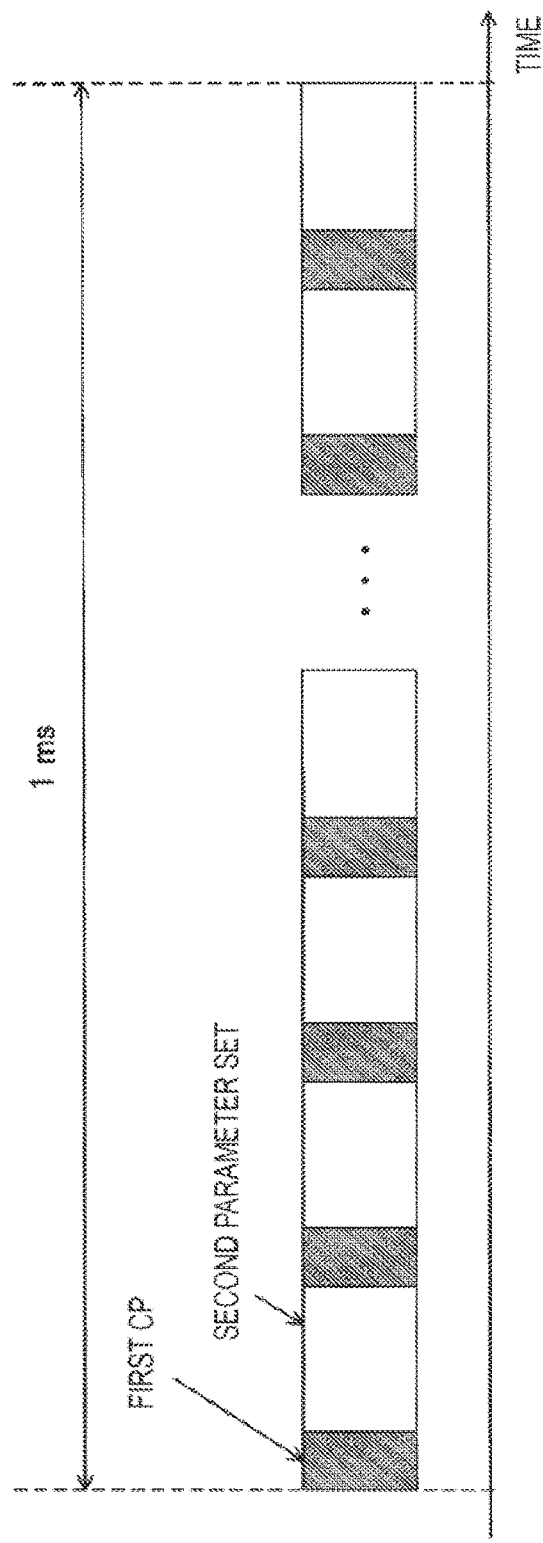
FIG. 3 is a diagram illustrating an example of the frame structure according to the present embodiment.
Figure 4:
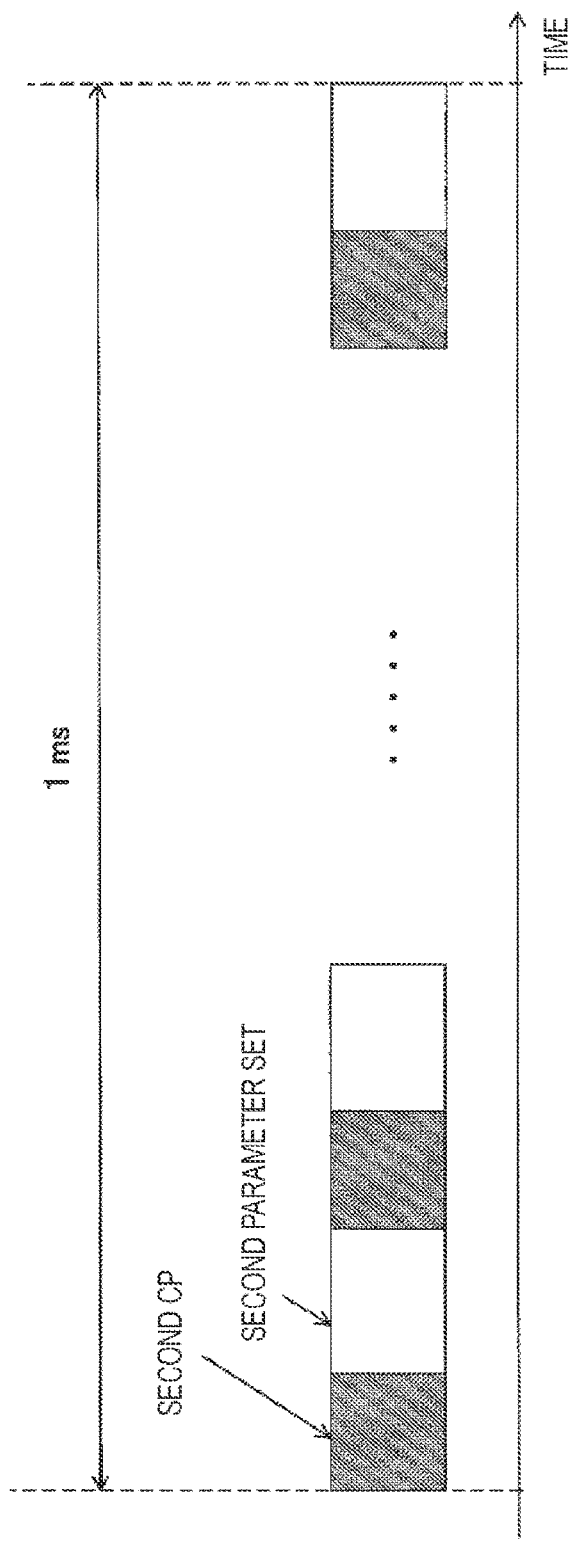
FIG. 4 is a diagram illustrating an example of the frame structure according to the present embodiment.

FIGS. 2 to 6 illustrate examples of subframe structures. FIG. 2 is a diagram illustrating an example of a subframe including first OFDM signals-1. FIG. 3 is a diagram illustrating an example of a subframe including second OFDM signals-1. The first parameter set is a subcarrier spacing of 15 kHz and the second parameter set is a subcarrier spacing of 30 kHz, thus, the length of the second OFDM signal-1 is half the length of the first OFDM signal-1. Accordingly, in a case that 14 first OFDM signals-1 are included in 1 ms, 28 second OFDM signals-1 are included in 1 ms. FIG. 4 is a diagram illustrating an example of a subframe including second OFDM signals-2. Propagation environments, such as multipath delay, at the same carrier frequency (band) are considered to be equivalent regardless of the parameters. Accordingly, the required CP length is desirably determined for each carrier frequency (band). In this case, the base station apparatus transmits OFDM signals with a CP length suitable for each carrier frequency (band). At this time, the terminal apparatus performs reception processing with a CP length determined for the carrier frequency (band) or a configured CP length.

Figure 5:
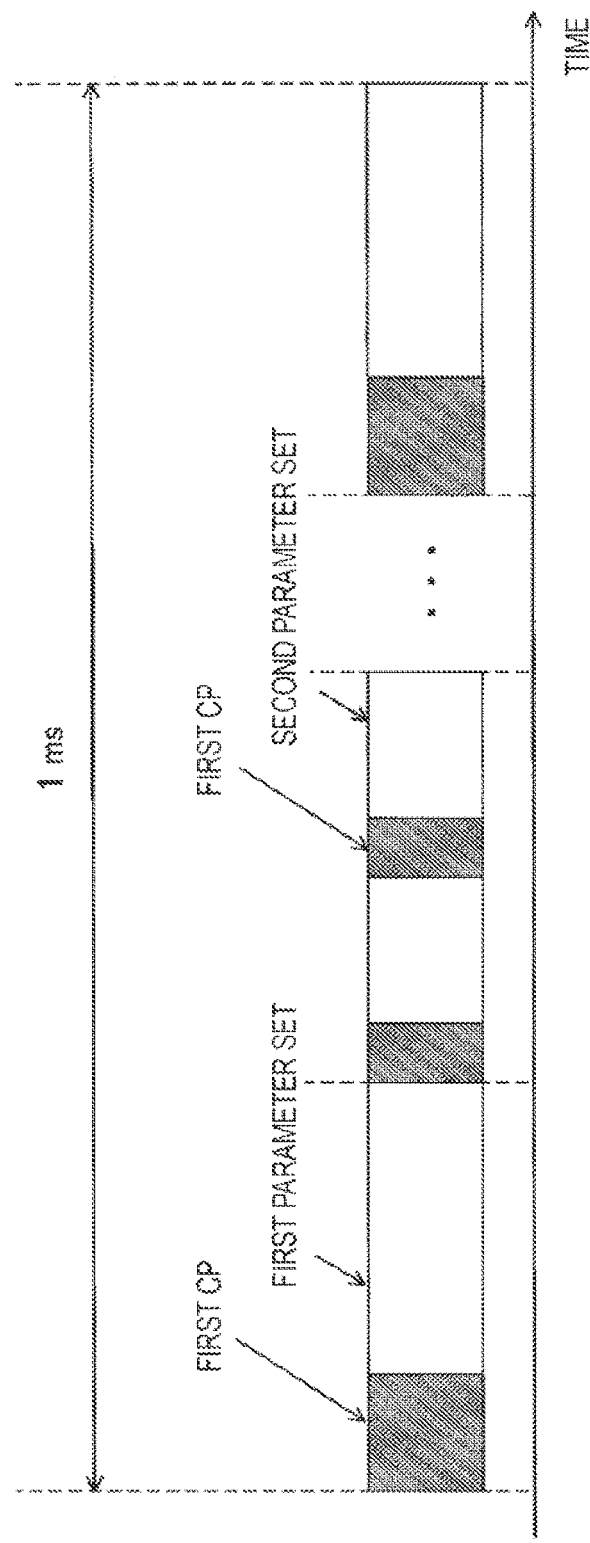
FIG. 5 is a diagram illustrating an example of the frame structure according to the present embodiment.

Furthermore, FIG. 5 illustrates an example in which the first OFDM signal-1 and the second OFDM signal-1 are multiplexed in 1 ms. The length of the second OFDM signal-1 is half the length of the first OFDM signal-1, thus two second OFDM signals-1 are included in the period of the first OFDM signal-1. Accordingly, the base station apparatus can select whether to map the first OFDM signal-1 or two second OFDM signals-1 for each period of the first OFDM signal-1. In the example in FIG. 5, two second OFDM signals-1 are mapped in the second period of the first OFDM signal-1. Note that the CP length may vary slightly for each OFDM signal. For example, in Long Term Evolution (LTE), the subcarrier spacing is 1.5 kHz, thus seven first OFDM signals-1 are included in a slot (0.5 ms). In the seven first OFDM signals-1, the CP length added to the first OFDM signal differs from the CP length added to the remaining OFDM signals. In a case that, the subcarrier spacing, which is a parameter similar to that in LTE, is 30 kHz, the CP length added to the first and eighth second OFDM signals-1 of the 14 second OFDM signals-1 included in 0.5 ms differs from the CP length added to the remaining second OFDM signals-1. In this case, the period of the first OFDM signal-1 including two second OFDM signals is limited. Thus, in a case of a subcarrier spacing of 30 kHz, the CP length added to the first second OFDM signal-1 of the 14 second OFDM signals-1 included in 0.5 ms is configured to differ from the CP length added to the remaining second OFDM signals-1. This configuration allows each of the seven periods of the first OFDM signal-1 to include two second OFDM signals-1 (two second OFDM signals-1 are evenly included in each of the seven periods of the first OFDM signal-1), thus improving flexibility. In a case that the second parameter subcarrier spacing is larger than 15 kHz (for example, N-fold) with the same CP overhead, the CP length added to the first OFDM symbol in 0.5 ms is adjusted to make the length of N OFDM signals equal to the length of one 15-kHz OFDM signal. Note that, in a case that the subcarrier spacing is smaller than 15 kHz (for example, oneNth), the CP length is adjusted to make the length of one OFDM signal equal to the length of two 15-kHz OFDM signals.

The terminal apparatus uses a synchronization signal/discovery signal for time/frequency synchronization to perform a cell search for detecting a physical cell identity (PCID, cell ID, or system ID) and/or a beam search for detecting a beam identifier (beam ID or beam cell ID). Note that the cell ID can include a beam ID. Furthermore, a cell ID including a beam ID is also referred to as an extended cell ID to distinguish between the cell ID including a beam ID and a cell ID including no beam ID. Furthermore, the discovery signal includes some or all of a synchronization signal, a cell-specific reference signal, and CSI-RS. In a case that a synchronization signal is generated based on a cell ID and a beam ID, the terminal apparatus can recognize the cell ID and the beam ID from a synchronization signal sequence. Furthermore, in a case that the base station apparatus changes a beam pattern based on a radio resource such as a subframe to which the synchronization signal is mapped, the synchronization signal is generated based on information about the cell ID and the radio resources. Examples of the information about the radio resources include a subframe number and a subband number.

Furthermore, one or more types of synchronization signals may be used. In a case that two types of synchronization signals, which are a Primary Synchronization Signal (PSS) and a Secondary Synchronization Signal (SSS), are used, the cell ID and/or the beam ID need to be recognized by using both PSS and SSS. Furthermore, different types of synchronization signal may be responsible for respective functions. For example, PSS can be used to identify the cell ID, and SSS can be used to identify the beam ID. In another example, PSS and SSS can be used to identify the cell ID, and another synchronization signal can be used to identify the beam ID.

In a case of supporting data communication with the first parameter set and the second parameter set at the same carrier frequency (band), the base station apparatus can transmit the synchronization signal/discovery signal with the first parameter and/or the second parameter. In other words, the base station apparatus can transmit the synchronization signal/discovery signal with the parameter specified for each carrier frequency/band. In this case, the terminal apparatus receives the synchronization signal/discovery signal with the parameter specified for each carrier frequency/band to perform a cell search. Furthermore, the base station apparatus can transmit the synchronization signal/discovery signal with multiple parameters at a certain carrier frequency/band. In this case, the terminal apparatus receives the synchronization signal/discovery signal with the multiple parameters to perform a cell search. Alternatively, for example, in a case that the parameter is specified for each service, the terminal apparatus receives a synchronization signal/discovery signal with the desired parameter to perform a cell search.

The base station apparatus can configure a common signal period for a certain subframe. A common signal period length can be configured by using the number of OFDM symbols or the time period. During the common signal period, some or all of a cell-specific reference signal, a CSI-RS, and a synchronization signal are transmitted. In a case of the same common signal period length, the number of symbols included in the common signal period varies depending on the parameter set. For example, in a case of a common signal period length including two first OFDM signals-1, the same common signal period length includes four second OFDM signals-1. Accordingly, transmission of the synchronization signal during the common signal period improves synchronization accuracy because the second OFDM signal-1 can transmit more synchronization signals than the first OFDM signal-1. Alternatively, in terms of a cell search, the second OFDM signal-1 can transmit the synchronization signal more repeatedly compared to the first OFDM signal-1, thus allowing the coverage to be extended with the synchronization accuracy maintained. Note that the common signal period may have a fixed length.

Figure 6:
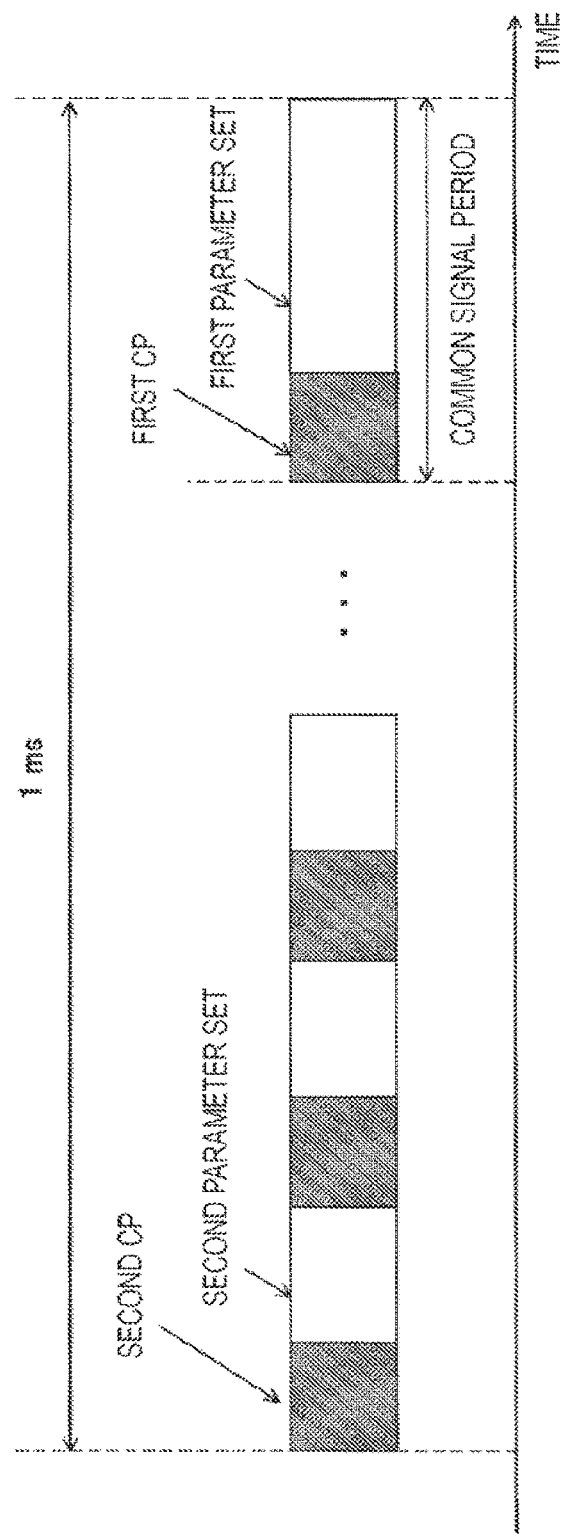
FIG. 6 is a diagram illustrating an example of the frame structure according to the present embodiment.

Furthermore, in a case that the base station apparatus transmits the synchronization signal/discovery signal with a specified parameter (for example, the first parameter set) at a certain carrier frequency and transmits a data signal with another parameter set (for example, the second parameter set), the data signal can be transmitted by using the first parameter set, and the synchronization signal/discovery signal can be transmitted by using the second parameter set. In this case, the terminal apparatus uses the synchronization signal/discovery signal with the second parameter set to synchronize with the base station apparatus and uses the first parameter set to demodulate the data signal. FIG. 6 is a diagram illustrating an example of a subframe structure in a case that the data signal is transmitted by using the second parameter set and that the synchronization signal is transmitted by using the first parameter set. In the example in FIG. 6, the common signal period, which is a signal period common within the cell, is configured in 1 ms (within the subframe). A signal transmitted during the common signal period may be the same signal sequence within the cell or a different sequence for each terminal apparatus. Furthermore, the common signal period length may be fixed or configured by the base station apparatus. Note that different parameters can be used for the primary synchronization signal and the secondary synchronization signal. For example, the base station apparatus can transmit the primary synchronization signal by using a common parameter in a cell (in the example of FIG. 6, the first parameter set) and transmit the secondary synchronization signal by using the same parameter (in the example of FIG. 6, the second parameter set) as that for the data signal. Note that a synchronization signal with the common parameter in the cell is also referred to as a cell specific synchronization signal and a synchronization signal with a parameter specific to a terminal is also referred to as a UE specific synchronization signal. Furthermore, the common signal period needs to be configured in a subframe in which the synchronization signal is transmitted. For example, in a case that the synchronization signal is transmitted at an interval of 5 ms (or five subframes), the common signal period is configured at an interval of 5 ms (or five subframes). Note that the discovery signal can include the cell specific synchronization signal. Note that a transmission period of the synchronization signal may be configured by the base station apparatus. The transmission period of the synchronization signal can be included in the system information. Note that a common parameter set in a cell used for the synchronization signal and the like can be the same as a reference parameter set and a reference CP. In this case, the base station apparatus does not need to transmit a parameter set for the synchronization signal, thus enabling a reduction in overhead. Furthermore, the common parameter set in the cell may differ from the reference parameter set and the reference CP. This enhances flexibility of the system to allow the base station apparatus/terminal apparatus to configure parameters suitable for various use cases or scenarios.

Furthermore, the base station apparatus can frequency-multiplex multiple parameter sets. For example, in a certain subframe, the base station apparatus can use the first parameter set in one subband of the system bandwidth and use the second parameter set in another subband. In other words, signals with different subcarrier spacings are multiplexed in the system bandwidth. In a case that power spectral density is constant in the system bandwidth, signal power per subcarrier of the first parameter set is lower than signal power per subcarrier of the second parameter set. In other words, in a case that the number of subcarriers allocated is the same between a transmit signal with the first parameter set and a transmit signal with the second parameter set, the transmit power of the first parameter set is lower than the transmit power of the second parameter set. In this case, the terminal apparatus can determine receive power of the second parameter set based on receive power of the first parameter set for demodulation. Note that, in order for different parameter sets to have similar synchronization accuracy, the transmit power of the first parameter set is desirably made equivalent to the transmit power of the second parameter set, for the synchronization signal. For example, in the same system bandwidth, the number of subcarriers of the synchronization signal with the first parameter set is double the number of subcarriers of the synchronization signal with the second parameter set. Alternatively, the synchronization signal with the first parameter set has the same number of subcarriers as the synchronization signal with the second parameter set, and the synchronization signal with the first parameter set has the same signal power per subcarrier as the synchronization signal with the second parameter set. Furthermore, in a case that the base station apparatus transmits a reference signal common to the first parameter set and the second parameter set, the terminal apparatus can recognize transmit power of a data signal/reference signal with a different parameter, the transmit power being specific to the different parameter set, based on the transmit power of the reference signal.

Furthermore, the subframe structure may vary depending on whether the cell is an anchor cell such as a macro cell or the like. For example, the base station apparatus can transmit, in PCell, a subframe in which the common signal period is configured but may not necessarily transmit, in SCell, a subframe in which the common signal period is configured. In other words, PCell and SCell have different configurations regarding the common signal period, and the base station apparatus can configure no common signal period in SCell. Furthermore, the base station apparatus can vary the number of parameter sets for each cell in the same band. For example, the base station apparatus can transmit a signal with one parameter set in PCell and a signal with multiple parameter sets in SCell. Furthermore, the base station apparatus can use a common parameter set for each CC to perform transmission. In this case, the terminal apparatus uses a parameter set configured for PCell to perform communication in SCell.

Furthermore, the base station apparatus can recognize suitable CSI based on a CSI report from the terminal apparatus. The CSI reported by the terminal apparatus includes CQI/PMI/RI/CRI/PSI. Parameter Set Indication (PSI) is an indicator for indicating a suitable one of multiple parameter sets. CSI is calculated from the cell specific reference signal or CSI-RS. Note that, for the CSI-RS, a CSI-RS that is not beamformed (non-precoded CSI-RS) or a CSI-RS that is beamformed (beamformed CSI-RS) can be transmitted (configured). Furthermore, the base station apparatus can include the information of the non-precoded CSI-RS or the information of the beamformed CSI-RS in configuration information about CSI-RS. The information about the non-precoded CSI-RS includes some or all of information about CodeBook Subset Restriction (CBSR), information about a code book, and interference measurement restriction that is a configuration of whether to restrict resources in measurement of interference. The information about the beamformed CSI-RS includes some or all of an ID list of CSI-RS configurations, an ID list of CSI-Interference Measurement (CSI-IM) configurations, information about codebook subset restriction, and interference measurement restriction that is a configuration of whether to restrict resources in measurement of interference. The ID list of CSI-IM configurations includes ID information about one or more CSI-IM configurations, and the ID information about CSI-IM configurations includes some or all of CSI-IM configuration IDs and the interference measurement restriction. Furthermore, CSI-IM is used for interference measurement.

The base station apparatus can associate at least CSI-RS for channel measurement with CSI-IM for interference measurement to include, in the higher layer signalling, a configuration (CSI process) regarding a procedure for calculating channel state information. The CSI process can include some or all of the CSI process ID, the information of the non-precoded CSI-RS, and the information of the beamformed CSI-RS. The base station apparatus can configure one or more CSI processes. The base station apparatus can generate feedback of CSI independently for each of the CSI processes. The base station apparatus can configure a different CSI-RS resource and different CSI-IM for each CSI process. The terminal apparatus performs a CSI report individually for each of one or more CSI processes configured. Furthermore, the CSI process is configured in a prescribed transmission mode.

For example, inter-carrier interference occurs during high-speed movement, thus a subcarrier spacing during the high-speed movement is desirably wider than that during low-speed movement. Thus, the base station apparatus can transmit a CSI-RS configuration for the CSI report for each parameter set. In this case, the terminal apparatus can calculate CSI for each parameter set to report the CSI to the base station apparatus. Furthermore, the base station apparatus can include the configurations of the parameter sets in one CSI-RS configuration. In this case, the terminal apparatus selects a suitable parameter set from the configured multiple parameter sets to report PSI. Note that the base station apparatus can map, in the common signal period, a CSI-RS with a parameter set different from a parameter set for data transmission. Furthermore, the terminal apparatus can transmit, to the base station apparatus, a scheduling request or a communication request with a parameter set different from a parameter set for data transmission. In this case, the base station apparatus transmits a CSI-RS with a different parameter set in accordance with the request from the terminal apparatus.

As described above, the base station apparatus may transmit a signal with multiple parameter sets at a certain carrier frequency. In a case that a neighbor cell also supports multiple parameter sets, the terminal apparatus may receive a signal with a different parameter set as neighbor cell interference. To reduce the neighbor cell interference, the terminal apparatus can eliminate or suppress the neighbor cell interference. In a case that the terminal apparatus includes a function to eliminate or suppress the neighbor cell interference, the base station apparatus can transmit assist information (neighbor cell information) for eliminating or suppressing the neighbor cell interference. The assist information includes some or all of a physical cell ID, the number of CRS ports, a $P_A$ list, $P_B$, a Multimedia Broadcast multicast service Single Frequency Network (MBSFN) subframe configuration, a transmission mode list, a resource allocation granularity, a subframe structure, a ZP/NZP CSI-RS configuration, Quasi Co-Location (QCL) information, a frame format, parameter sets supported, parameter sets configured for the respective subframes, the CP length, the FFT size, the system bandwidth, and whether the system is LTE. $P_A$ is a power ratio (power offset) of PDSCH and CRS in an OFDM symbol to which CRS is not mapped. $P_B$ is a power ratio (power offset) of PDSCH in an OFDM symbol to which CRS is mapped and PDSCH in an OFDM symbol to which CRS is not mapped. The subframe structure is information for indicating whether the subframe is the uplink subframe, the downlink subframe, or the uplink and downlink subframe. The QCL information is information about QCL for a prescribed antenna port, a prescribed signal, or a prescribed channel. In a case that long term performance of a channel on which a symbol on an antenna port is carried can be estimated from a channel on which a symbol on another antenna port is carried, the two antenna ports are said to be quasi co-located (have a relationship of QCL). The long term performance includes delay spread, Doppler spread, Doppler shift, average gain, and/or average delay. In other words, in a case that two antenna ports are quasi co-located (in a QCL state), the terminal apparatus can consider the two antenna ports to have the same long term performance. Note that, for each of the parameters included in the above-described assist information, one value (candidate) may be configured, or multiple values (candidates) may be configured. In a case of multiple values being configured, the terminal apparatus interprets the parameters as parameters for indicating a value that may be configured by the base station apparatus causing interference, and detects (identifies), among the multiple values, a parameter configured as an interference signal. Furthermore, the above-described assist information can eliminate or suppress some or all of the reference signal, PDSCH, and (E)PDCCH transmitted from the neighbor cell. In addition, the above-described assist information may be used in a case that various types of measurement are carried out. The measurement includes Radio Resource Management (RRM) measurement, Radio Link Monitoring (RLM) measurement, and Channel State Information (CSI) measurement.

In a case of determining the neighbor cell interference to be LTE, the terminal apparatus can eliminate or suppress the interference signal by using the assist information. Furthermore, in a case that the configuration information about subframes being transmitted by the serving cell is the same as the configuration information about subframes being transmitted by the neighbor cell interference, the terminal apparatus can eliminate or suppress the interference signal by using the assist information. The same configuration information about subframes refers to, for example, a case where the subframes of the serving cell and the neighbor cell are the downlink subframes, and/or have the same parameter set, and/or have the same CP length. Furthermore, in a case that the configuration information about subframes being transmitted by the serving cell is different from the configuration information about subframes being transmitted by the neighbor cell interference, the terminal apparatus uses a linear scheme to suppress the interference instead of using the assist information to eliminate the neighbor cell interference. The different configuration information about subframes refers to, for example, a case where the neighbor cell is transmitting uplink subframes, a case where parameter sets are different, or a case where CP lengths are different. Furthermore, in a case that the neighbor cell may communicate by using a parameter set different from a parameter set used for communication with the serving cell, the terminal apparatus uses a linear scheme to suppress the interference instead of using the assist information to eliminate the neighbor cell interference. For example, a case where the neighbor cell supports multiple parameter sets and/or the terminal apparatus does not eliminate the neighbor cell interference by using the assist information. Furthermore, for example, in a case that the neighbor cell supports one parameter set and is communicating by using a parameter set different from a parameter set for the serving cell, the terminal apparatus does not eliminate the neighbor cell interference by using the assist information.

Note that the communication system according to the present embodiment can include a System Frame Number (SFN) for frame synchronization between the base station apparatus and the terminal apparatus and between terminal apparatuses connected to the base station apparatus. SFN can be a serial number of a frame transmitted by the base station apparatus or the terminal apparatus. The communication system according to the present embodiment can count the SFN in a unit of a given time length regardless of the frame structure configured by the base station apparatus (or radio parameters for defining the frame structure, or base parameters for determining the parameters for the radio frame, or the parameter set). In other words, the base station apparatus according to the present embodiment can perform transmission such that terminal apparatuses with different frame structures configured by the base station apparatus each receive a frame with the same SFN, but receive a different subframe number (or the number of subframes or OFDM symbols received).

The base station apparatus/terminal apparatus transmits, to the terminal apparatus/base station apparatus, a demodulation reference signal (UE specific reference signal, Demodulation Reference Signal (DMRS), a downlink demodulation reference signal, and an uplink demodulation reference signal) used for data demodulation. The base station apparatus/terminal apparatus uses the demodulation reference signal to demodulate a data signal. 5G is required to support various use cases and bandwidths. Examples of the requirement include a low transmission rate, a high transmission rate, low delay, high reliability, a high-speed moving environment, and a high-frequency band communication. Demodulations are desirably enabled that are respectively suitable for such various radio environments and transmission schemes. Thus, desirably, the demodulation reference signals can be flexibly transmitted (configured). Furthermore, in a case that a common signal waveform, such as an OFDM, is used in the downlink and the uplink, the reference signals of the downlink and the uplink desirably have a common configuration (setting) to some extent.

The base station apparatus/terminal apparatus can transmit at least one type of demodulation reference signal. For example, it is assumed that two types of demodulation reference signals are available: a basic demodulation reference signal (also referred to as a first DMRS) and an extended demodulation reference signal (also referred to as a second DMRS). Furthermore, the first DMRS is mapped to one or more symbols in earlier part of the slot in order to suppress delay time for demodulation. Note that simple references to the demodulation reference signal/DMRS below include an uplink or downlink demodulation reference signal/DMRS. Furthermore, the demodulation reference signal/DMRS transmitted by the base station apparatus is also referred to as the downlink demodulation reference signal/DMRS. Furthermore, the demodulation reference signal/DMRS transmitted by the terminal apparatus is also referred to as the uplink demodulation reference signal/DMRS.

Figure 7:
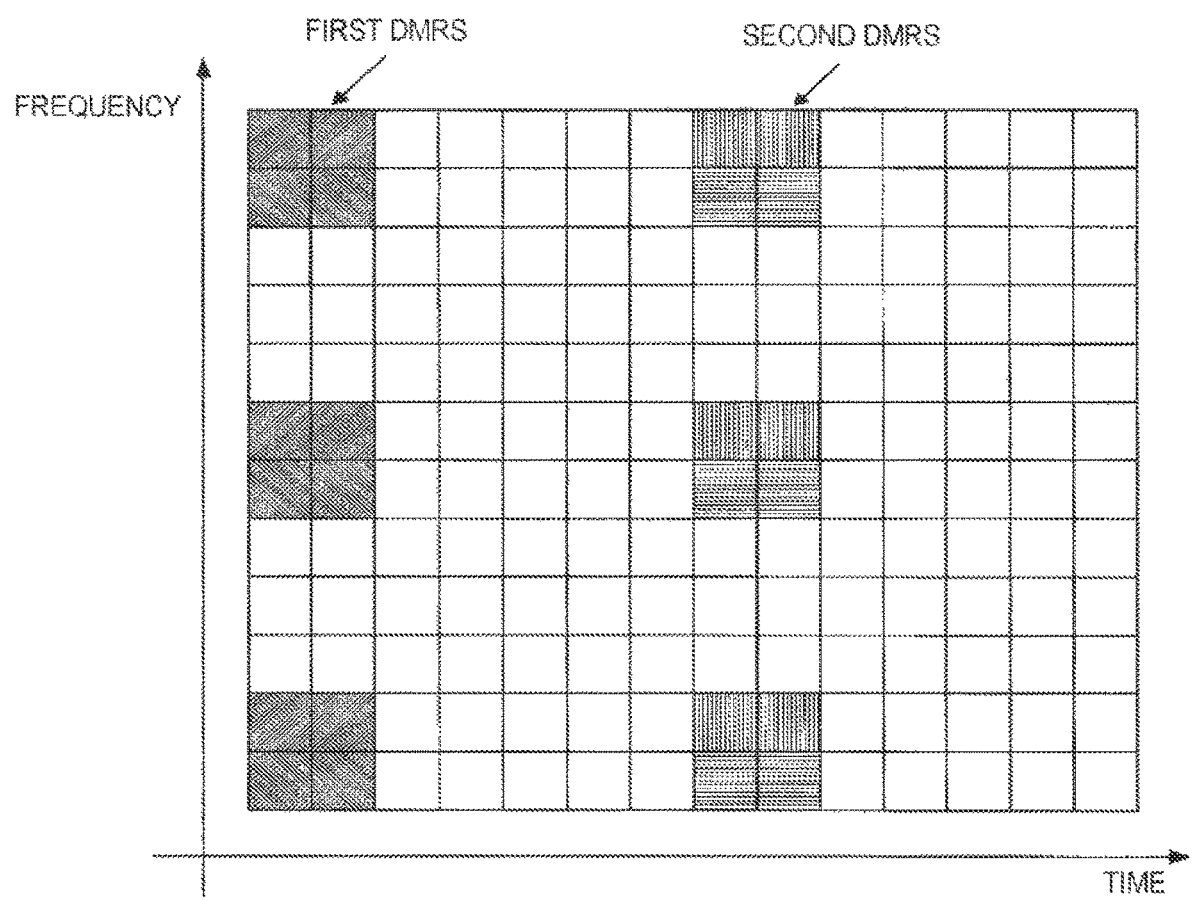
FIG. 7 is a diagram illustrating an example of mapping of demodulation reference signals according to the present embodiment.

FIG. 7 is a diagram illustrating an example of mapping of demodulation reference signals according to the present embodiment. FIG. 7 illustrates an example of mapping of demodulation reference signals in 12 subcarriers in a frequency direction and in 14 OFDM symbols in a time direction. Note that an area represented by one subcarrier and one OFDM symbol is also referred to as a resource element. In the example in FIG. 7, the first DMRSs are mapped to resource elements hatched by lines extending upward and rightward and resource elements hatched by lines extending downward and rightward. The second DMRSs are mapped to resource elements hatched by vertical lines and resource elements hatched by horizontal lines. Two resource elements hatched by the same lines are spread and multiplexed by using an Orthogonal Cover Code (OCC). Note that which resource element to be used for mapping and which OCC to be used depend on an antenna port number. Note that, in the example in FIG. 7, the multiplication by OCC is performed in the time domain, but it can be performed in the frequency domain or in the time domain and the frequency domain. Furthermore, the first DMRS and the second DMRS can be independently transmitted. For example, the first DMRS and the second DMRS are transmitted by using an OCC sequence length of 2. In this case, the antenna port number through which the first DMRS is transmitted differs from the antenna port number through which the second DMRS is transmitted. Furthermore, the OCC sequence length may differ between a case where the first DMRS or the second DMRS alone is mapped and a case where both the first DMRS and the second DMRS are mapped. For example, the OCC sequence length is 2 in a case that first DMRS or the second DMRS alone is mapped, and the OCC sequence length is 4 in a case that both the first DMRS and the second DMRS are mapped. In this case, the first DMRSs mapped to the resource elements hatched by lines extending upward and rightward, and the second DMRSs mapped to the resource elements hatched by vertical lines are spread and multiplexed by using OCC sequence length of 4. The number of orthogonal DMRSs thus differs between the case where the first DMRS or the second DMRS alone is transmitted and the case where both the first DMRS and the second DMRS are transmitted. The number of resource elements for DMRS can be flexibly varied according to the number of streams spatially multiplexed (the number of layers or the number of ranks), thus enabling efficient communication.

Figure 8:
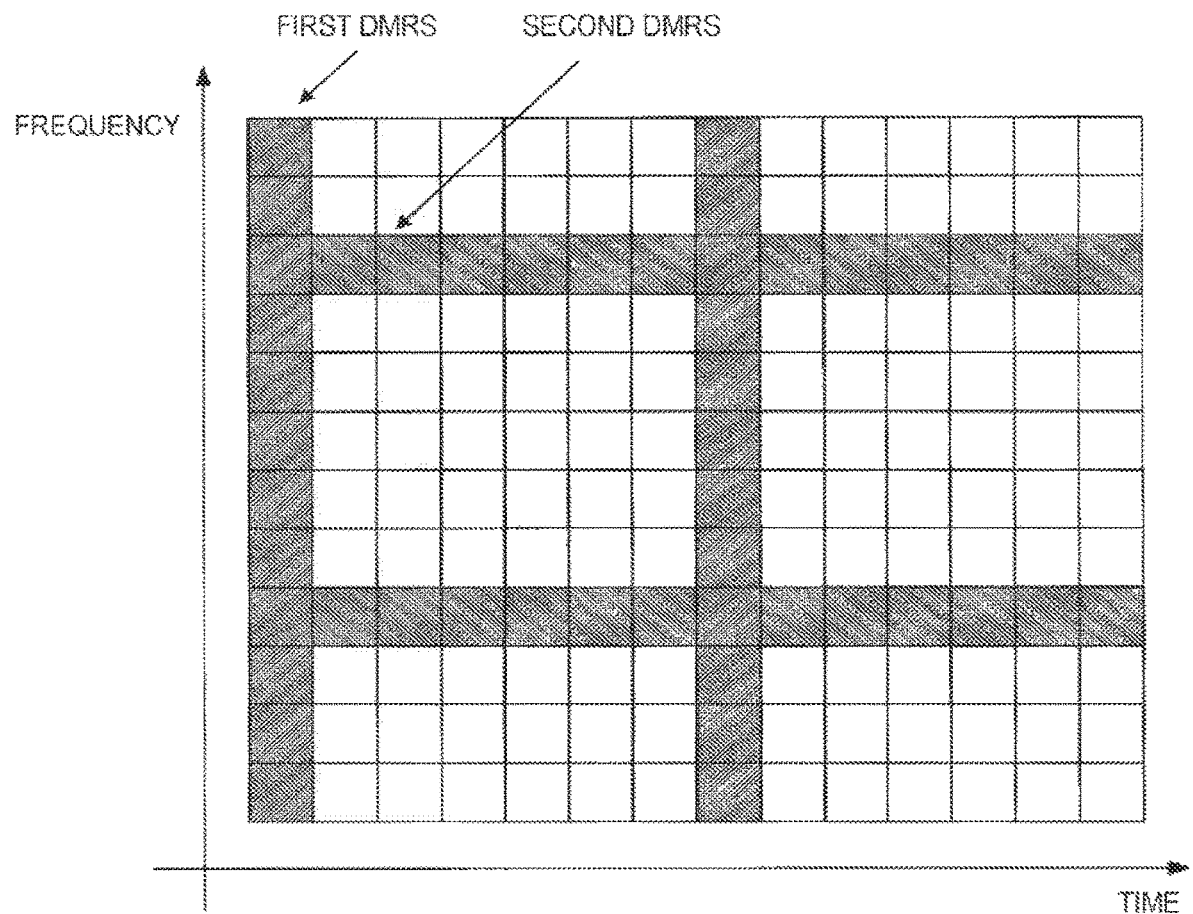
FIG. 8 is a diagram illustrating an example of the mapping of demodulation reference signals according to the present embodiment.

For example, communication in a high frequency band may disadvantageously lead to phase noise of an oscillator. The phase noise causes the phase of receive signal to temporally fluctuate. In this case, it is desirable to compensate for the phase noise. The phase noise includes a Common Phase Error (CPE) common to all subcarriers. In order to compensate for CPE, the demodulation reference signal, having a high frequency density, that can be mapped to all of the subcarriers is desirable. Furthermore, the demodulation reference signal desirably has a high time density to track a temporal fluctuation of phase noise. An attempt to realize this by using one demodulation reference signal leads to consumption of many radio resources, thus degrading efficiency. Thus, the base station apparatus/terminal apparatus transmits a demodulation reference signal with a high frequency density and a demodulation reference signal with a high time density. FIG. 8 illustrates an example of demodulation reference signals according to the present embodiment. In FIG. 8, the first DMRSs are mapped to resource elements hatched by lines extending upward and rightward, and the second DMRSs are mapped to resource elements hatched by lines extending downward and rightward. As seen in FIG. 8, the first DMRS is a demodulation reference signal with a high frequency density, and the second DMRS is a demodulation reference signal with a high time density. The phase noise compensation can be efficiently achieved by transmitting two types of demodulation reference signal as described above.

Figure 9:
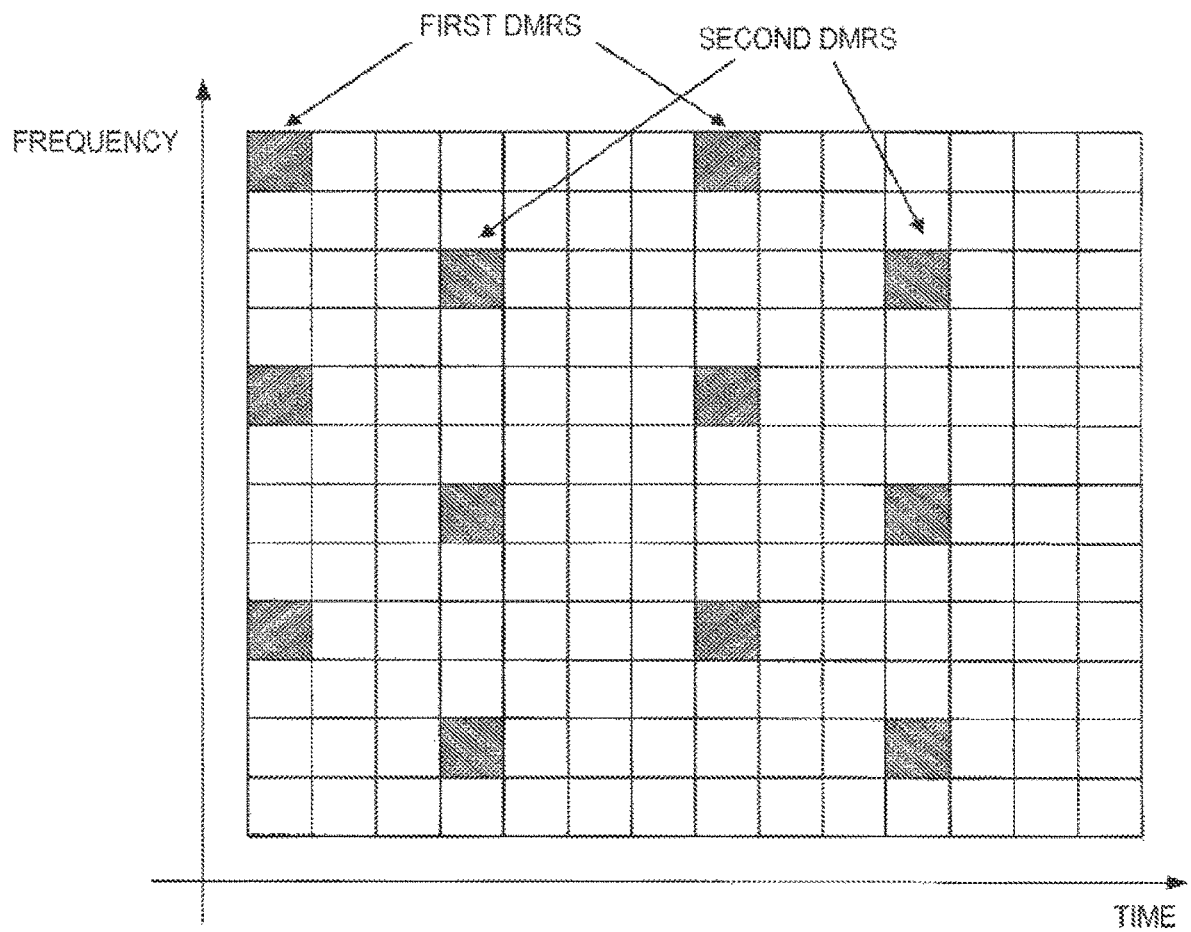
FIG. 9 is a diagram illustrating an example of the mapping of demodulation reference signals according to the present embodiment.

For example, communication in a high-speed moving environment needs a demodulation reference signal with a high time density to track a channel which is momentarily changed. However, in a low-speed moving environment, the demodulation reference signal with a high time density is redundant, thus degrading communication efficiency. FIG. 9 illustrates an example of mapping of demodulation reference signals according to the present embodiment. In FIG. 9, the first DMRSs are mapped to resource elements hatched by lines extending upward and rightward, and the second DMRSs are mapped to resource elements hatched by lines extending downward and rightward. The base station apparatus can transmit either the first DMRS or the second DMRS to terminal apparatuses moving at a low speed and transmit the first DMRS and the second DMRS to terminal apparatuses moving at a high speed. Thus, the base station apparatus can efficiently transmit the demodulation reference signals.

Figure 10:
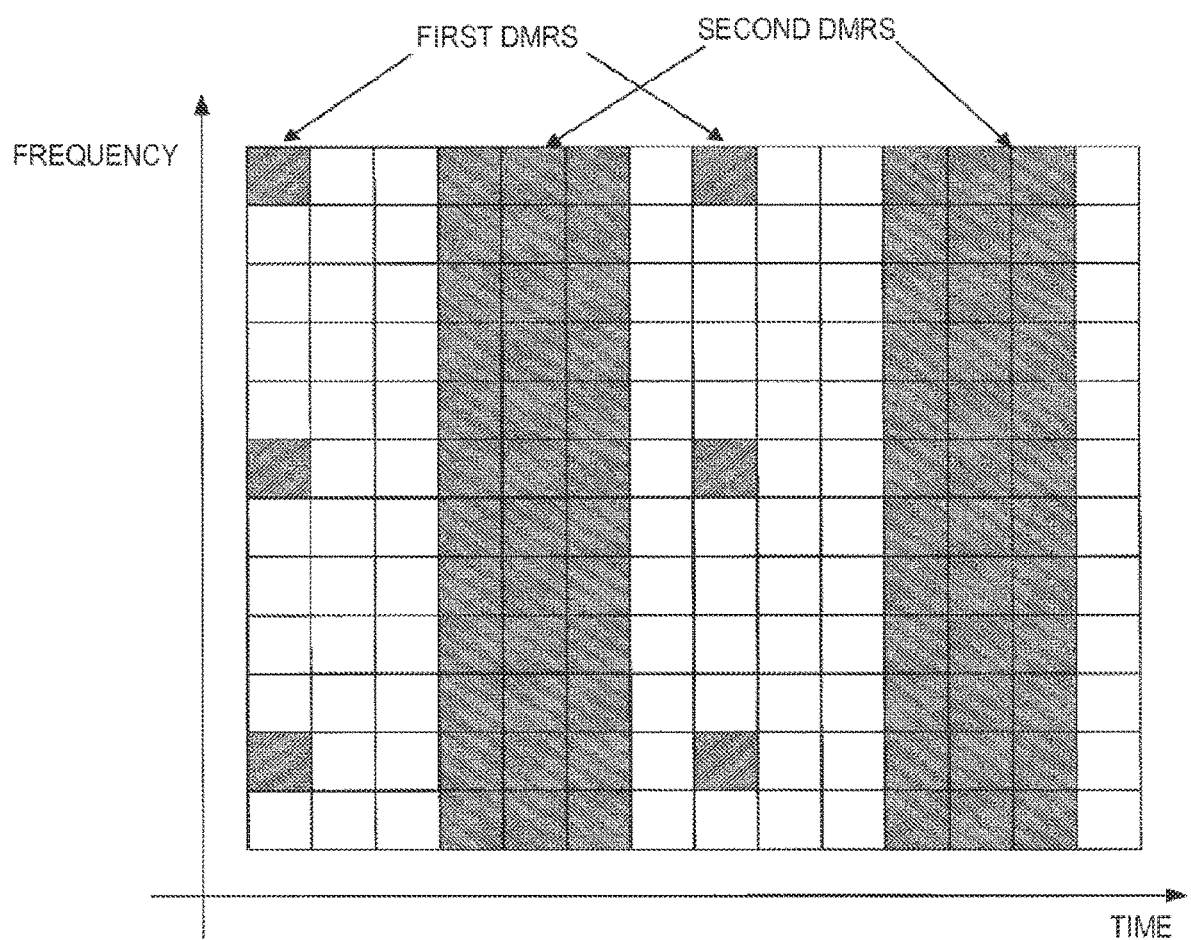
FIG. 10 is a diagram illustrating an example of the mapping of demodulation reference signals according to the present embodiment.

Note that the DMRS is used for purposes other than a demodulation purpose. For example, in a case that beamforming is used for communication, a beam needs to be tracked because the optimum beam is varied by movement or rotation of the terminal apparatus. DMRS can be used to track the beam. FIG. 10 illustrates an example of mapping of demodulation reference signals according to the present embodiment. In FIG. 10, the first DMRSs are mapped to resource elements hatched by lines extending upward and rightward, and the second DMRSs are mapped to resource elements hatched by lines extending downward and rightward. The first DMRS is transmitted for demodulation, and the second DMRS is transmitted for beam tracking. In order for a receiving side to track the beam, the base station apparatus/terminal apparatus transmits the second DMRS that is beamformed by using the same beam pattern (direction) for each OFDM symbol. Note that the beam pattern applied to the second DMRS may be the same as or different from the beam pattern applied to the first DMRS and data signals. In this case, the receiving terminal apparatus/base station apparatus can demodulate the data signals by using the first DMRS, and search for a suitable receive beam by using the second DMRS. Note that CSI can be calculated by using the second DMRS. Furthermore, the base station apparatus/terminal apparatus can also transmit the second DMRS that is beamformed by using a different beam pattern for each OFDM symbol. In this case, the base station apparatus/terminal apparatus having received the second DMRS notifies the base station apparatus/terminal apparatus having transmitted the second DMRS of information for indicating the most suitable DMRS (for example, information for indicating a time/frequency resource such as OFDM symbol number/slot number/subframe number/subband number including DMRS with the highest reception SNR). This allows the base station apparatus/terminal apparatus having transmitted the second DMRS to identify the suitable transmit beam. Note that the information for indicating the most suitable DMRS can be included in CSI calculated by the terminal apparatus based on the second DMRS.

As described above, the base station apparatus/terminal apparatus transmits multiple types of DMRS to enable efficient communication suitable for various radio environments and transmission schemes.

The base station apparatus can include the parameters for the first downlink DMRS and/or second downlink DMRS in control information to transmit the control information to the terminal apparatus. The parameters for the first downlink DMRS include some or all of the number of layers, an antenna port number, a mapping pattern, frequency density, time density, and a scrambling identity. The mapping pattern indicates one of candidates for mapping of DMRSs to resource elements (subcarriers, resource blocks, subbands, or OFDM symbols). Note that, in a case of periodic mapping, the mapping pattern indicates the first resource element (subcarrier, resource block, subband, or OFDM symbol). The frequency density is the density of DMRSs mapped in the frequency domain and indicates mapping to all or some of the subcarriers. Mapping to some of the subcarriers has one or more granularities. The time density is the density of DMRSs mapped in the time domain and indicates mapping to all or some of the OFDM symbols. Mapping to some of the OFDM symbols has one or more granularities. The scrambling identity is a parameter regarding an initial value for generating a DMRS sequence. The parameters for the second downlink DMRS include some or all of the number of layers, an antenna port number, a mapping pattern, frequency density, time density, and a scrambling identity. However, some or all of the parameters may differ between the first DMRS and the second DMRS. For example, the number of layers in the parameters for the second DMRS is larger than the number of layers in the parameters for the first DMRS. For example, the antenna port number in the parameters for the second DMRS is larger than the antenna port number in the parameters for the first DMRS. For example, the antenna port number differs between the parameters for the first DMRS and the parameters for the second DMRS. For example, the patterns and the number of mapping patterns that are configurable differ between the first DMRS and the second DMRS. For example, the first DMRS has one mapping pattern, and the second DMRS has multiple mapping patterns. For example, the number of configurations for frequency density/time density that are configurable in the parameters for the second DMRS is larger than the number of configurations for frequency density/time density that are configurable in the parameters for the first DMRS. Note that the parameters for the first DMRS and the parameters for the second DMRS include a configuration for indicating that any DMRS is not transmitted. For example, the mapping pattern or the time/frequency density indicates that any DRMS is not transmitted. Note that, in the parameters for the first DMRS and the parameters for the second DMRS, the configurable parameters, candidate patterns, and the number of candidates may vary for each carrier frequency range.

The base station apparatus can notify a terminal apparatus of information for indicating that data signals addressed to other terminal apparatuses than the terminal apparatus are spatially multiplexed with the data signal addressed to the terminal apparatus (information for notifying multiplex). The terminal apparatus can recognize, based on the information for notifying multiplex, that the data signals addressed to the other terminal apparatuses than the terminal apparatus are multiplexed with the data signal addressed to the terminal apparatus. The terminal apparatus can thus apply, to the receive signal, an interference suppression process in which the data signals addressed to the other terminal apparatuses than the terminal apparatus are considered to be interference signals. Furthermore, the base station apparatus can notify the terminal apparatus of the parameters for the first DMRS and/or the parameters for the second DMRS addressed to the other terminal apparatuses than the terminal apparatus. The Furthermore, the base station apparatus can notify the terminal apparatus of the parameters for the first DMRS and/or the parameters for the second DMRS addressed to the other terminal apparatuses than the terminal apparatus in a case that a prescribed radio parameter (for example, a signal waveform, a subcarrier spacing, or a spatial multiplexing number) indicates a prescribed value (for example, in a case that the base station apparatus spatially multiplexes data signals addressed to five or more terminal apparatuses). Furthermore, the base station apparatus can notify, to the terminal apparatus, the parameters for the first DMRS and/or the parameters for the second DMRS addressed to the other terminal apparatuses than the terminal apparatus, which are included in the parameters for the first DMRS and/or the parameters for the second DMRS notified to the terminal apparatus. Note that the first DMRS can be addressed to the terminal apparatus, and the second DMRS can be addressed to the other terminal apparatuses than the terminal apparatus.

The base station apparatus notifies, to a terminal apparatus, information for indicating that data signals addressed to other terminal apparatuses than the terminal apparatus are spatially multiplexed with the data signal addressed to the terminal apparatus (multiplexing notification information). No limitation is imposed on such information. For example, the base station apparatus may transmit information for indicating to the terminal apparatus to apply a modulo operation to the receive signal. Such information can be used as the information for notifying multiplex. This is because, in a case that the base station apparatus uses nonlinear precoding to spatially multiplex data signals, the terminal apparatus needs to apply the modulo operation to the receive signal. In a case that the base station apparatus indicates to the terminal apparatus to apply the modulo operation, the terminal apparatus can recognize that the data signals addressed to the other terminal apparatuses than the terminal apparatus are spatially multiplexed with the data signal addressed to the terminal apparatus.

Note that the base station apparatus/terminal apparatus may transmit neither the first DMRS nor the second DMRS. In this case, the receiving terminal apparatus/base station apparatus demodulates data signals without using DMRS.

Note that, in a case of transmitting a data signal, the base station apparatus may always transmit the first DMRS. In this case, the first DMRS has fixed time/frequency density. Furthermore, mapping of the second DMRS is optional. In a case that the first DMRS has a fixed pattern of time/frequency density, the time/frequency density may not be indicated (configured) in the control information. In other words, the control information includes the time/frequency density of the second DMRS. Note that the mapping pattern of the first DMRS may vary for each carrier frequency range. For example, within a carrier frequency range lower than a prescribed frequency, the first DMRS is discretely mapped in the frequency direction in the slot (resource block). For example, within a carrier frequency range higher than a prescribed frequency, the first DMRS is mapped to all of the subcarriers in the slot (resource block).

The base station apparatus can include the parameters for the first uplink DMRS and/or second uplink DMRS in the control information to transmit the control information to the terminal apparatus. The terminal apparatus transmits the uplink DMRS based on the parameters for the first uplink DMRS and/or the parameters for the second uplink DMRS transmitted from the base station apparatus. The parameters for the first uplink DMRS include some or all of the number of layers, an OCC sequence, a mapping pattern, frequency density, time density, and a scrambling identity. Furthermore, the parameters for the second uplink DMRS include some or all of the number of layers, an OCC sequence, mapping pattern, frequency density, time density, and a scrambling identity.

In the uplink, the terminal apparatus can use OFDM and DFT-spread-OFDM (SC-FDMA) as signal waveforms for transmission. Note that the terminal apparatus can transmit multiple layers (streams) in OFDM and transmit one layer (stream) in DFT-spread-OFDM. In this case, it is desirable that the uplink DMRS does not depend on the signal waveform. However, OFDM and DFT-spread-OFDM have different parameters and configurations for the uplink DMRS. For example, in DFT-spread-OFDM, the second uplink DMRS is not configured (not transmitted). For example, in DFT-spread-OFDM, the frequency density may be mapped only to all of the subcarriers. Note that, in DFT-spread-OFDM, in a case that the frequency density indicates some of the subcarriers, the signal is repeated N times in the time domain such that the uplink DMRS is mapped every N subcarriers, where N is an integer satisfying N>0. Note that a resultant spectrum is shaped like the teeth of a comb, thus the frequency density is also referred to as a comb. Furthermore, the mapping pattern is periodic, thus N candidates for the mapping pattern are available. Note that, in the uplink, an OFDM signal and a DFT-spread-OFDM signal may be multiplexed (collide) and that, in this case, two DMRSs with different signal waveforms desirably have a common configuration.

Note that the parameters for the first DMRS and/or the parameters for the second DMRS include information for indicating the transmit power. The information for indicating the transmit power can be transmit power values of the first uplink DMRS and/or the second uplink DMRS, or a power ratio (power offset) between the first uplink DMRS and the second uplink DMRS. Note that the transmit power of the first uplink DMRS and/or the second uplink DMRS may be configured regardless of the signal waveform or may be configured for each signal waveform.

Figure 11:
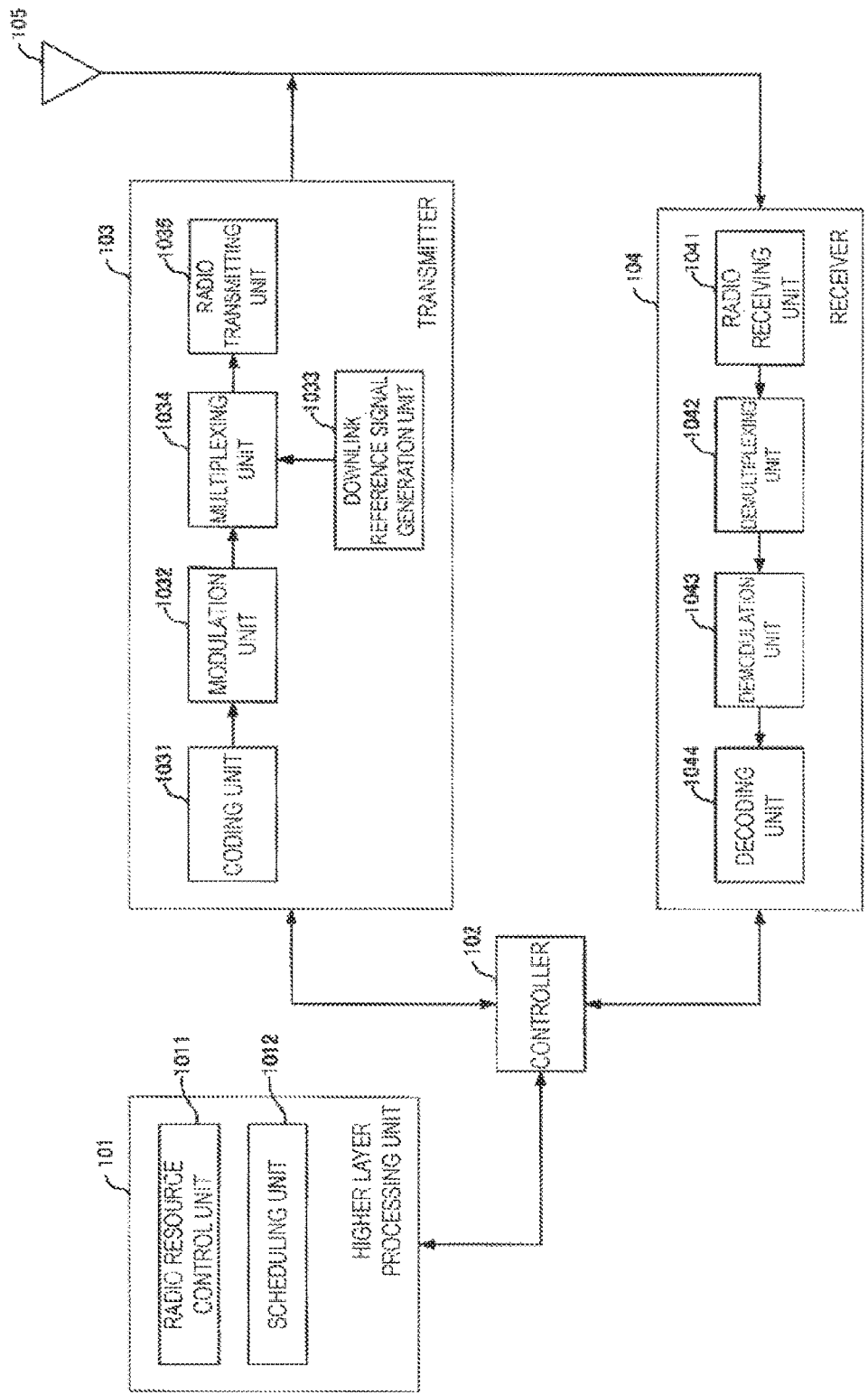
FIG. 11 is a block diagram illustrating an example configuration of a base station apparatus according to the present embodiment.

FIG. 11 is a schematic block diagram illustrating a configuration of the base station apparatus 1A according to the present embodiment. As illustrated in FIG. 11, the base station apparatus 1A is configured to include a higher layer processing unit (higher layer processing step) 101, a controller (controlling step) 102, a transmitter (transmitting step) 103, a receiver (receiving step) 104, and a transmit and/or receive antenna 105. The higher layer processing unit 101 is configured to include a radio resource control unit (radio resource controlling step) 1011 and a scheduling unit (scheduling step) 1012. The transmitter 103 is configured to include a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 is configured to include a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the terminal apparatus transmits information (parameters) for indicating whether the prescribed function is supported. In a case where a terminal apparatus does not support a prescribed function, the terminal apparatus does not transmit information (parameters) for indicating whether the prescribed function is supported. In other words, whether the prescribed function is supported is reported by whether information (parameters) for indicating whether the prescribed function is supported is transmitted. Information (parameters) for indicating whether a prescribed function is supported may be reported by using one bit of 1 or 0.

The radio resource control unit 1011 generates, or acquires from a higher node, the downlink data (the transport block) allocated in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses. Furthermore, the radio resource control unit 1011 configures (manages) the downlink reference parameter (subcarrier spacing), the CP length, the number of FFT points, and the like. Furthermore, the radio resource control unit 1011 configures (manages) the reference parameter (subcarrier spacing) for the terminal apparatus (uplink), the CP length, the number of FFT points, and the like.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates information to be used for scheduling the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2 through the transmit and/or receive antenna 105.

The coding unit 1031 codes the HARQ indicator, the downlink control information, and the downlink data that are input from the higher layer processing unit 101, in compliance with a predetermined coding scheme, such as block coding, convolutional coding, and turbo coding, or in compliance with a coding scheme determined by the radio resource control unit 1011. The modulation unit 1032 modulates the coded bits input from the coding unit 1031, in compliance with a predetermined modulation scheme, such as Binary Phase Shift Keying (BPSK), Quadrature Phase Shift Keying (QPSK), quadrature amplitude modulation (16QAM), 64QAM, and 256QAM, or in compliance with a modulation scheme determined by the radio resource control unit 1011.

The downlink reference signal generation unit 1033 generates, as the downlink reference signal, a sequence, known to the terminal apparatus 2A, that is determined in accordance with a rule predetermined based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) of a modulation symbol resulting from multiplexing or the like to generate an OFDM symbol, attaches a Cyclic Prefix (CP) to the generated OFDM symbol to generate a baseband digital signal (OFDM signal), converts the baseband digital signal into an analog signal, removes unnecessary frequency components from the analog signal through filtering, up-converts the resultant analog signal into a signal of a carrier frequency, performs power amplification to generate a radio signal, and outputs the radio signal to the transmit and/or receive antenna 105 for transmission.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) of the signal from which the CP has been removed, extracts a signal in the frequency domain, and outputs the resulting signal to the demultiplexing unit 1042.

The demultiplexing unit 1042 demultiplexes the signal input from the radio receiving unit 1041 into signals such as PUCCH, PUSCH, and uplink reference signal. The demultiplexing is performed based on radio resource allocation information, included in the uplink grant notified to each of the terminal apparatuses 2, that is predetermined by the base station apparatus 1A by using the radio resource control unit 1011.

Furthermore, the demultiplexing unit 1042 performs channel compensation for PUCCH and PUSCH. The demultiplexing unit 1042 demultiplexes the uplink reference signal.

The demodulation unit 1043 performs Inverse Discrete Fourier Transform (IDFT) of PUSCH, acquires modulation symbols, and demodulates, for each of the modulation symbols of PUCCH and PUSCH, a reception signal in compliance with a predetermined modulation scheme, such as BPSK, QPSK, 16QAM, 64QAM, and 256QAM, or in compliance with a modulation scheme that the base station apparatus 1A notified to each of the terminal apparatuses 2 in advance by using the uplink grant.

The decoding unit 1044 decodes the coded bits of PUCCH and PUSCH that have been demodulated, at a coding rate, in compliance with a predetermined coding scheme, that is predetermined or notified from the base station apparatus 1A to the terminal apparatus 2 in advance by using the uplink grant, and outputs the decoded uplink data and uplink control information to the higher layer processing unit 101. In a case where PUSCH is retransmitted, the decoding unit 1044 performs the decoding by using the coded bits that is input from the higher layer processing unit 101 and retained in an HARQ buffer, and the demodulated coded bits.

Figure 12:
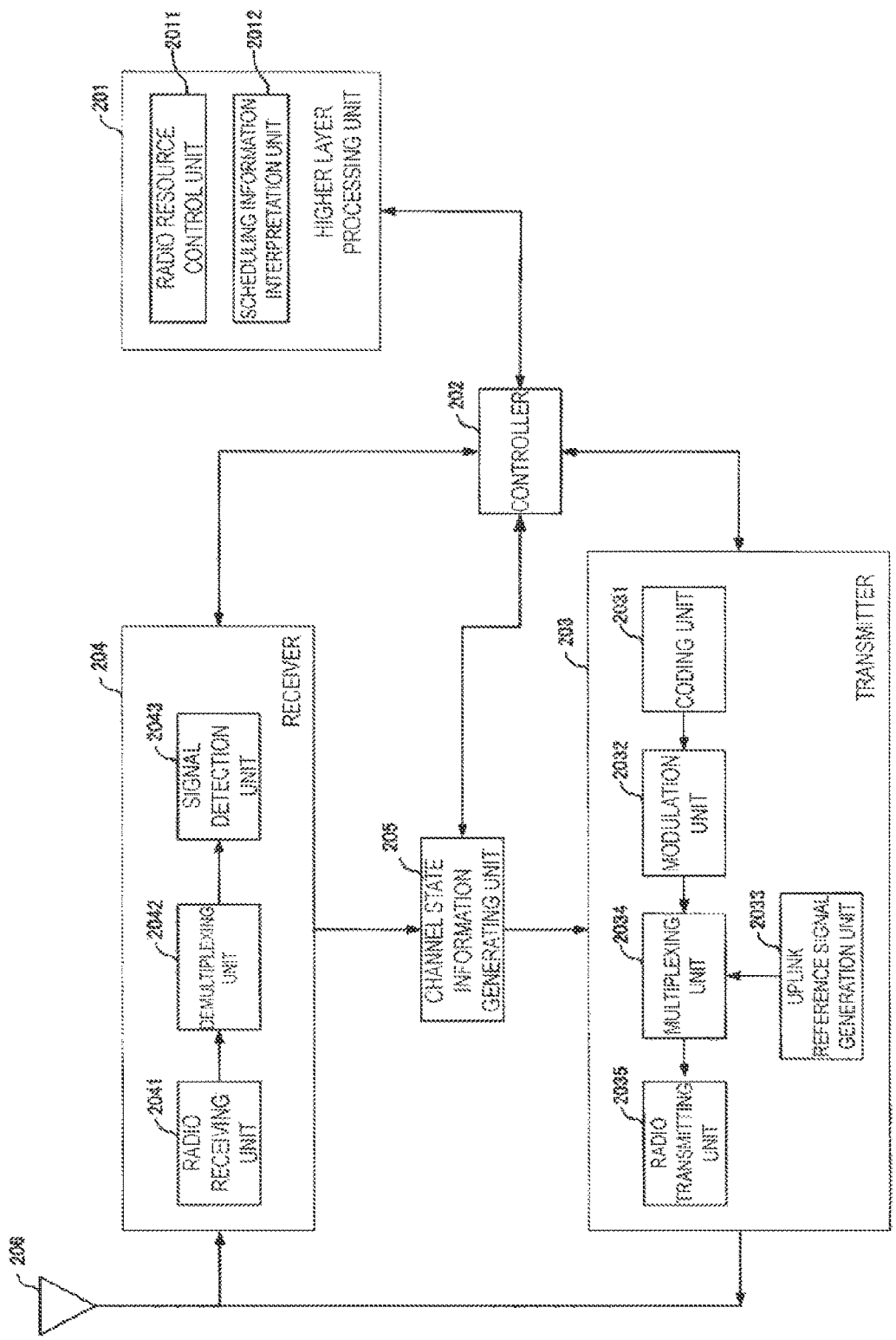
FIG. 12 is a block diagram illustrating an example configuration of a terminal apparatus according to the present embodiment.

FIG. 12 is a schematic block diagram illustrating a configuration of the terminal apparatus 2 according to the present embodiment. As illustrated in FIG. 12, the terminal apparatus 2A is configured to include a higher layer processing unit (higher layer processing step) 201, a controller (controlling step) 202, a transmitter (transmitting step) 203, a receiver (receiving step) 204, a channel state information generation unit (channel state information generating step) 205, and a transmit and/or receive antenna 206. The higher layer processing unit 201 is configured to include a radio resource control unit (radio resource controlling stop) 2011 and a scheduling information interpretation unit (scheduling information interpreting step) 2012. The transmitter 203 is configured to include a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 is configured to include a radio receiving unit (radio receiving step) 2041, a demultiplexing unit (demultiplexing step) 2042, and a signal detection unit (signal detecting step) 2043.

The higher layer processing unit 201 outputs, to the transmitter 203, the uplink data (the transport block) generated by a user operation or the like. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information for indicating a terminal apparatus function supported by the terminal apparatus 2A.

Furthermore, the radio resource control unit 2011 manages various configuration information of the terminal apparatuses 2A. Furthermore, the radio resource control unit 2011 generates information to be mapped to each uplink channel, and outputs the generated information to the transmitter 203.

The radio resource control unit 2011 acquires configuration information of CSI feedback transmitted from the base station apparatus, and outputs the acquired information to the controller 202. Furthermore, the radio resource control unit 1011 acquires configuration information such as a downlink reference parameter (subcarrier spacing), a CP length, and the number of FFT points from the base station apparatus, and outputs the configuration information to the controller 202. Furthermore, the radio resource control unit 1011 acquires configuration information such as an uplink reference parameter (subcarrier spacing), a CP length, and the number of FFT points from the base station apparatus, and outputs the configuration information to the controller 202.

The scheduling information interpretation unit 2012 interprets the downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

Based on the information input from the higher layer processing unit 201, the controller 202 generates a control signal for controlling the receiver 204, the channel state information generation unit 205, and the transmitter 203. The controller 202 outputs the generated control signal to the receiver 204, the channel state information generation unit 205, and the transmitter 203 to control the receiver 204 and the transmitter 203.

The controller 202 controls the transmitter 203 to transmit CSI generated by the channel state information generation unit 205 to the base station apparatus.

In accordance with the control signal input from the controller 202, the receiver 204 demultiplexes, demodulates, and decodes a reception signal received from the base station apparatus 1A through the transmit and/or receive antenna 206, and outputs the resulting information to the higher layer processing unit 201.

The radio receiving unit 2041 converts, by down-converting, a downlink signal received through the transmit and/or receive antenna 206 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform of the signal from which the CP has been removed, and extracts a signal in the frequency domain.

The demultiplexing unit 2042 demultiplexes the extracted signal into PHICH, PDCCH, EPDCCH, PDSCH, and the downlink reference signal. Furthermore, the demultiplexing unit 2042 performs channel compensation for PHICH, PDCCH, and EPDCCH based on a channel estimation value of a desired signal obtained from channel measurement, detects downlink control information, and outputs the detected downlink control information to the controller 202. The controller 202 outputs PDSCH and the channel estimation value of the desired signal to the signal detection unit 2043.

The signal detection unit 2043, by using PDSCH and the channel estimation value, detects a signal, and outputs the detected signal to the higher layer processing unit 201.

The transmitter 203 generates an uplink reference signal in accordance with the control signal input from the controller 202, codes and modulates the uplink data (the transport block) input from the higher layer processing unit 201, multiplexes PUCCH, PUSCH, and the generated uplink reference signal, and transmits a signal resulting from the multiplexing to the base station apparatus 1A through the transmit and/or receive antenna 206.

The coding unit 2031 codes the uplink control information input from the higher layer processing unit 201 in compliance with a coding scheme such as convolutional coding and block coding. Furthermore, the coding unit 2031 performs turbo coding in accordance with information used for the scheduling of PUSCH.

The modulation unit 2032 modulates the coded bits input from the coding unit 2031, in compliance with a modulation scheme, such as BPSK, QPSK, 16QAM, or 64QAM, that is notified by using the downlink control information, or in compliance with a modulation scheme predetermined for each channel.

The uplink reference signal generation unit 2033 generates a sequence that is determined according to a predetermined rule (formula), based on a Physical Cell Identity (PCI, also referred to as a cell ID or the like) for identifying the base station apparatus 1A, a bandwidth in which the uplink reference signal is mapped, a cyclic shift notified by using the uplink grant, a parameter value for generation of a DMRS sequence, and the like.

In accordance with the control signal input from the controller 202, the multiplexing unit 2034 rearranges modulation symbols of PUSCH in parallel and then performs Discrete Fourier Transform (DFT) of the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to resource elements for each transmit antenna port.

The radio transmitting unit 2035 performs Inverse Fast Fourier Transform (IFFT) of a signal resulting from the multiplexing and the modulation according to SC-FDMA scheme to generate an SC-FDMA symbol, attaches CP to the generated SC-FDMA symbol to generate a baseband digital signal (SC-FDMA signal), converts the baseband digital signal into an analog signal, removes unnecessary frequency components, performs conversion to a carrier frequency by up-conversion, performs power amplification, and performs output to the transmit and/or receive antenna 206 for transmission.

Note that the terminal apparatus 2 can perform modulation according to not only the SC-FDMA scheme but also the OFDMA scheme.

The controller 202 of the terminal apparatus 2 according to the present embodiment includes a function to control the transmit power of the uplink signal, generated by the transmitter 203, that is transmitted to the base station apparatus 1. The controller 202 can calculate, for example, transmit power $P_{PUSCH,c}(i)$ to transmit an i-th subframe to be transmitted to a c-th cell, based on Equation 1.

Equation 1

$$P_{PUSCH,c}(i) = \min \begin{cases} P_{CMAX,c}(i), \\ \left( \begin{array}{l} 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right) \end{cases} \quad (1)$$

$P_{CMAX,c}(i)$ is a term of maximum allowable transmit power of the terminal apparatus 2 for transmitting the i-th subframe to be transmitted to the c-th cell. $M_{PUSCH,c}(i)$ represents the number of resource blocks allocated to the terminal apparatus 2 for transmitting the i-th subframe to be transmitted to the c-th cell. In other words, the item represented by $10 \log_{10}(M_{PUSCH,c}(i))$ is an item of the amount of radio resources allocated to the terminal apparatus 2. $P_{O\_PUSCH,c}(j)$ is a term of target receive power for transmission to the c-th cell, which is, in other words, a term of target receive power in a case that the terminal apparatus 2 transmits the uplink signal to the base station apparatus 1 including the c-th cell. Note that j is an integer and that changing j allows $P_{O\_PUSCH,c}(j)$ to have a different value. $\alpha_c(j)$ is a term (coefficient) of a propagation loss compensation between the base station apparatus 1 including the c-th cell and the terminal apparatus 2. Note that j is an integer and that changing j allows $\alpha_c(j)$ to have a different value. $PL_c(j)$ is a term of the propagation loss between the base station apparatus 1 including the c-th cell and the terminal apparatus 2. $\Delta_{TF,c}(i)$ is a term of a modulation scheme applied by the modulation unit 2032 to the signal included in the i-th subframe to be transmitted to the c-th cell. $f_c(i)$ is a term of a control error caused in a case that the controller 202 controls the transmit power of the signal included in the i-th subframe to be transmitted to the c-th cell. Variable names of the terms of Equation 1 are designated for convenience of description, and the operation of the terminal apparatus 2 according to the present embodiment is not limited due to the variable names. Each of the variable names can be any selected name.

The controller 202 of the terminal apparatus 2 according to the present embodiment can control the transmit power based on the frame structure (or radio parameters for defining the frame structure, or base parameters for determining the parameters for the radio frame, or parameter set, or reference parameters, or reference parameter set) configured by the multiplexing unit 2034 (transmitter 203). Specifically, at least one of the multiple terms included in Equation 1 is associated with the frame structure configured by the multiplexing unit 2034.

The controller 202 according to the present embodiment can control the transmit power in a subframe length as a unit of control as indicated by Equation 1. The controller 202 can control the transmit power in any unit of control, such as a slot length, an OFDM symbol length, a SC-FDMA symbol length, and a frame length, instead of the subframe length. The controller 202 according to the present embodiment can configure the unit for controlling the transmit power based on the frame structure configured by the multiplexing unit 2034. For example, a 100th frame structure may have a long subcarrier spacing, and a 200th frame structure may have a shorter subcarrier spacing than the 100th frame structure. In such a case, the time interval (time granularity) at which the controller 202 controls the transmit power for the 100th frame structure can be shorter than that for the 200th frame structure. Such control allows the controller 202 to more flexibly control the transmit power of signal including a frame structure of which frame length (symbol length) is short. Furthermore, the controller 202 according to the present embodiment can change, for each frame structure, the time unit for calculating the multiple terms included in Equation 1.

The controller 202 according to the present embodiment can configure, for each frame structure, the term of the maximum allowable transmit power in Equation 1. For example, the controller 202 can configure the maximum allowable transmit power for a frame structure that needs to have high reliability to be higher than the maximum allowable transmit power for other frame structures. With such a configuration, uplink signals transmitted to the base station apparatus 1 by using a frame structure with high maximum allowable transmit power can be received with higher reception quality by the base station apparatus 1, compared to signals transmitted by using other frame structures. Note that, in a case that high reliability is required (for example, in a case of a prescribed frame structure), based on an indication or configuration from the base station apparatus 1, the terminal apparatus 2 can constantly use the maximum allowable transmit power for transmission without controlling the transmit power.

The controller 202 according to the present embodiment can configure, for each frame structure, the term of the amount of radio resources allocated to the terminal apparatus 2 in Equation 1. Furthermore, the controller 202 according to the present embodiment can configure the term of the amount of radio resources by using a common unit regardless of the frame structure. For example, the controller 202 according to the present embodiment can configure the term of the amount of radio resources by using a unit of RB-2in which the frequency bandwidth is fixed per unit. Since the bandwidth per unit is uniquely fixed in a unit of RB-2, a difference in subcarrier spacing which is one of the parameters of the frame structure, leads to a difference in the number of subcarriers included in RB-2. The use of the common frequency unit allows the controller 202 to configure the term of the amount of radio resources regardless of the frame structure.

The controller 202 according to the present embodiment can configure, for each frame structure, the term of the target receive power in Equation 1. For example, the controller 202 can configure the target receive power for a prescribed frame structure to be higher or lower than the target receive power configured for other frame structures than the prescribed frame structure. The controller 202 configures higher target receive power for the prescribed frame structure to improve reception quality of signals with the prescribed frame structure. On the other hand, the controller 202 configures lower target receive power for the prescribed frame structure to reduce interference power, caused by signals with the prescribed frame structure, that affects other cells or neighbor channels.

The controller 202 according to the present embodiment can further add, to the term of the target receive power in Equation 1, a term of a gain resulting from beamforming performed by the base station apparatus 1 and the terminal apparatus 2. For example, the controller 202 can define $B_c(i)$ as a compensation coefficient for the beamforming gain to configure $B^c(i) \times P_{O\_PUSCH,c}(j)$ as the term of the target receive power. In a case that the prescribed frame structure is configured, the controller 202 can take into account the compensation coefficient for the beamforming gain. The controller 202 can determine the compensation coefficient for the beamforming gain depending on whether the antenna 206 of the terminal apparatus 2 or the antenna 105 of the base station apparatus 1 performs beamforming. For example, the controller 202 can configure $B_c(i)$ to 1 in a case that beamforming is not performed and configure $B_c(i)$ to a real number smaller than or equal to 1 and greater than 0 in a case that beamforming is performed.

The controller 202 can configure, for each frame structure, the term of the propagation loss compensation in Equation 1. The controller 202 can configure, for each frame structure, a value to be included in a set of values that can be configured for the term of the propagation loss compensation.

The controller 202 can configure, for each frame structure, the term of the propagation loss in Equation 1. For example, in a case that a prescribed frame structure is configured, the controller 202 can take into account the compensation coefficient of the beamforming gain for the term of the propagation loss. For example, in the case that the prescribed frame structure is configured, the controller 202, in a case of configuring the propagation loss, can measure the propagation loss with the gain resulting from the beamforming performed by the base station apparatus 1 and the terminal apparatus 2 taken into account.

The controller 202 can further add a term of beamforming to Equation 1. As the term of the beamforming, the controller 202 can configure the gain resulting from the beamforming performed by the base station apparatus 1 and the terminal apparatus 2. In a case that a prescribed frame structure is configured, the controller 202 can configure a value selected from multiple values for the term of the beamforming. In the case that the prescribed frame structure is configured, the controller 202 can configure a prescribed value (for example, 0) for the term of the beamforming. The controller 202 can configure a difference between the gain resulting from the beamforming performed by the base station apparatus 1 and the terminal apparatus 2 and the gain of reference beamforming. As the gain of the reference beamforming, the controller 202 can use information about a reception gain of a common reference signal or a signal including common control information transmitted by the base station apparatus 1. The controller 202 can use, for the information about the gain resulting from the beamforming, the information about the reception gain of a specific reference signal or a signal including data addressed to the terminal apparatus 2.

In a case of controlling the transmit power of an uplink signal with a prescribed frame structure based on Equation 1, the controller 202 can calculate the multiple terms included in Equation 1 by using values configured for the prescribed frame structure. However, the controller 202 can configure at least one of the multiple terms of Equation 1 to a common value regardless of whether a different frame structure is configured. For example, the propagation loss calculated for a frame structure can be used as the propagation loss for another frame structure.

In a case that the controller 202 controls the transmit power of an uplink signal with a prescribed frame structure based on Equation 1 and that the terminal apparatus 2 simultaneously uses multiple component carriers (by carrier aggregation) to transmit the uplink signal, the controller 202 can calculate transmit power for each component carrier and control the transmit power based on the total transmit power value. In this case, in a case of totaling the transmit power values for the respective component carriers, the controller 202 can weight the transmit power value for each component carrier and total the weighted transmit power values, instead of simply totaling the transmit power values. The controller 202 can determine a weighting factor for each component carrier based on the frame structure configured for the component carrier. Of course, the controller 202 according to the present embodiment can control the transmit power in a case that carrier aggregation of multiple component carriers for which different frame structures are configured are performed.

In a case that the controller 202 controls the transmit power of an uplink signal with a prescribed frame structure based on Equation 1 and that the terminal apparatus 2 simultaneously transmits, as the uplink signals, at least a part of the data signal and a part of the control signal in different frequency resources, the controller 202 can subtract the transmit power required for transmission of the control signal from the term of the maximum allowable transmit power in Equation 1. Such a control allows the terminal apparatus 2 to avoid a disadvantageous failure to transmit the control signal. The controller 202 according to the present embodiment can configure, based on the frame structure configured for a signal including the control signal, the transmit power, required for transmission of the control signal, that is subtracted from the term of the maximum allowable transmit power in Equation 1.

The receiver 204 (higher layer processing unit 201) of the terminal apparatus 2 can acquire, from the base station apparatus 1, control information about at least one of the multiple terms included in Equation 1. The terminal apparatus 2 can acquire the control information from information included in Master Information Block (MIB) or System Information Block (SIB) broadcasted via broadcast information (e.g., a Broadcast CHannel (BCH)) of the base station apparatus 1. The terminal apparatus 2 can acquire the control information from control information (e.g., DCI notified via PDCCH) of the physical layer transmitted by the base station apparatus 1. A period at which the terminal apparatus 2 acquires the control information from the base station apparatus 1 may vary for each frame structure configured.

The control information, acquired by the terminal apparatus 2, that is information about at least one of the multiple terms included in Equation 1 can be associated with a prescribed frame structure of multiple frame structures. The controller 202 can configure, based on the acquired control information associated with the prescribed frame structure, at least one of the multiple items, included in Equation 1, that is associated with other frame structures than the prescribed frame structure.

The base station apparatus 1 can notify the terminal apparatus 2 of the control information, used for the terminal apparatus 2 to control the transmit power, that is information about at least one of the multiple terms included in Equation 1. The control information notified to the terminal apparatus 2 by the base station apparatus 1 and the notification method can be determined based on the frame structure configured by the base station apparatus 1. The base station apparatus 1 can broadcast the control information, associated with the prescribed frame structure, that is included in Master Information Block (MIB) or System Information Block (SIB) broadcasted via broadcast information (e.g., Broadcast CHannel (BCH)). The base station apparatus 1 can transmit the control information, associated with the prescribed frame structure, that is included in the control information of the physical layer (e.g., a signal including DCI and a TPC command notified via PDCCH). The period at which the base station apparatus 1 broadcasts or transmits the signal including the control information may vary for each frame structure configured. Note that the base station apparatus 1 can be configured not to simultaneously transmit the multiple pieces of control information associated with different frame structures. Furthermore, the base station apparatus 1 can be configured to notify the terminal apparatus 2 of the control information associated with the prescribed frame structure only by using the signal with the prescribed frame structure.

In a case of controlling the transmit power, the controller 202 according to the present embodiment can configure the transmit power per subcarrier to be different for each frame structure. For example, the transmit power per subcarrier in a frame structure with a subcarrier spacing of 15 kHz can be configured to be half the transmit power per subcarrier in a frame structure with a subcarrier spacing of 30 kHz. The control of the transmit power by the controller 202 allows the transmit power, per unit frequency, of the uplink signal transmitted by the terminal apparatus 2 (e.g., transmit power per 1 MHz or transmit power spectral density) to be constant. The above-described control allows, for example, flatness (smoothness) of a signal spectrum of a signal transmitted by the terminal apparatus 2 to be improved.

The terminal apparatus 2 according to the present embodiment can notify the base station apparatus 1 of information about the configuration capability of the transmit power supported by the terminal apparatus 2. The information about the configuration capability can be Power Headroom (PH). The controller 202 of the terminal apparatus 2 according to the present embodiment can calculate, for example, the power headroom $PH_{type1,c}(i)$ for transmitting an ith subframe to be transmitted to a cth cell based on Equation 2.

Equation 2

$$P_{PUCH,c}(i) = P_{CMAX,c}(i) - \{10 \quad \log_{10}(M_{PUSCH,c}(i) + P_{O\_PUSCH,c}(j) + \alpha_c(j) \cdot PL_c + \Delta_{TF,c}(i) + f_c(i)\} \quad (2)$$

As indicated by Equation 2, PH is expressed by a difference between the maximum allowable transmit power of the terminal apparatus 2 and the transmit power of the terminal apparatus 2 requested by the base station apparatus 1. A positive PH value indicates that the terminal apparatus 2 still has remaining transmit power (the terminal apparatus 2 can transmit signals at transmit power higher than the current transmit power). A PH of zero indicates that the terminal apparatus 2 does not have remaining transmit power (the terminal apparatus 2 cannot transmit signals at higher transmit power). A negative PH value indicates that the terminal apparatus 2 cannot transmit signals at the transmit power requested by the base station apparatus 1). Notifying, by the terminal apparatus 2, PH to the base station apparatus 1 allows the base station apparatus 1 to recognize the amount of radio resources to be allocated to the terminal apparatus 2. Note that, in a case of notifying, by the terminal apparatus 2 to which no resource is allocated, PH to the base station apparatus 1, the terminal apparatus 2 can calculate PH without taking into account the amount of radio resources. Furthermore, in a case that a resource has been allocated but transmission has failed for some reason, the terminal apparatus 2 can calculate PH with the allocated resources taken into account.

The terminal apparatus 2 according to the present embodiment can notify the base station apparatus 1 of PH for each frame structure. The period at which the terminal apparatus 2 notifies the base station apparatus 1 of PH may vary for each frame structure. The terminal apparatus 2 can notify, to the base station apparatus 1, only PH regarding the frame structure requested by the base station apparatus 1.

Furthermore, the base station apparatus 1 and the terminal apparatus 2 can predetermine a prescribed frame structure for which the PH is to be calculated. In this case, the terminal apparatus 1 can calculate, based on PH, associated with the prescribed frame structure, that is notified by the terminal apparatus 2, PHs associated with other frame structures than the prescribed frame structure.

Note that the term subtracted from the maximum allowable transmit power in Equation 2 includes all of the multiple terms, included in Equation 1, that are used for the controller 202 to calculate the transmit power. In a case of calculating PH, the controller 202 according to the present embodiment may not necessarily include all of the multiple terms included in Equation 1, in the term subtracted from the maximum allowable transmit power. Terms that the controller 202 includes in the term subtracted from the maximum allowable transmit power may be a different combination of terms for each frame structure configured or may be common to the frame structures.

Note that the terminal apparatus 2 according to the present embodiment can constantly transmit uplink signals at the maximum allowable transmit power of the terminal apparatus 2 in a prescribed frame structure. In this case, PH is always 0 in a case that the prescribed frame structure is configured, thus the terminal apparatus 2 may not notify the base station apparatus 1 of PH. In other words, the terminal apparatus 2 according to the present embodiment can be configured not to transmit PH in a case that a prescribed frame structure is configured.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing functions of an embodiment related to an aspect of the present invention may be recorded in a computer-readable recording medium. The functions may be realized by causing a computer system to read the program recorded in the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining a program for a short time, or any other computer-readable recording medium.

Furthermore, each functional block or various characteristics of the apparatuses used in the above-described embodiment may be implemented or performed in an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may be constituted of a digital circuit or an analog circuit. Furthermore, in a case that with advances in semiconductor technology, a circuit integration technology appears that replaces the present integrated circuits, one or more aspects of the present invention can use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be suitably used in a base station apparatus, a terminal apparatus, and a communication method. An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program

REFERENCE SIGNS LIST

1A Base station apparatus
2A, 2B Terminal apparatus
101 Higher layer processing unit
102 Controller
103 Transmitter
104 Receiver
105 Transmit and/or receive antenna
1011 Radio resource control unit
1012 Scheduling unit
1031 Coding unit
1032 Modulation unit
1033 Downlink reference signal generation unit
1034 Multiplexing unit
1035 Radio transmitting unit
1041 Radio receiving unit
1042 Demultiplexing unit
1043 Demodulation unit
1044 Decoding unit
201 Higher layer processing unit
202 Controller
203 Transmitter
204 Receiver
205 Channel state information generation unit
206 Transmit and/or receive antenna
2011 Radio resource control unit
2012 Scheduling information interpretation unit
2031 Coding unit
2032 Modulation unit
2033 Uplink reference signal generation unit
2034 Multiplexing unit
2035 Radio transmitting unit
2041 Radio receiving unit
2042 Demultiplexing unit
2043 Signal detection unit

What is claimed is:
1. A base station apparatus for communicating with a terminal apparatus, the base station apparatus comprising:
a downlink reference signal generator that generates a first demodulation reference signal and a second demodulation reference signal that are reference signals used to demodulate a data signal; and
a radio signal transmitter that transmits the first demodulation reference signal, the second demodulation reference signal, and control information to the terminal apparatus, wherein
the control information includes parameters regarding the first demodulation reference signal and parameters regarding the second demodulation reference signal,
the parameters regarding the first demodulation reference signal include information for deriving an antenna port index,
the parameters regarding the second demodulation reference signal include information for deriving an antenna port index, and a time domain density or a frequency domain density with which demodulation reference signals are mapped into a minislot,
the first demodulation reference signal is mapped before the second demodulation reference signal in the minislot, and the first demodulation reference signal is mapped in a fixed mapping pattern for each carrier frequency range, and wherein
a time duration length of the minislot is one of 2, 4, or 7 OFDM symbols, and a first mapping pattern of the first demodulation reference signal and a second mapping pattern of the second demodulation reference signal are different.
2. The base station apparatus according to claim 1, wherein a spatial multiplexing order supported for the first demodulation reference signal is lower than a spatial multiplexing order supported for the second demodulation reference signal.
3. The base station apparatus according to claim 1, wherein the first demodulation reference signal is mapped to all subcarriers of the minislot in one of the carrier frequency ranges.
4. A terminal apparatus for communicating with a base station apparatus, the terminal apparatus comprising:
a radio signal receiver that receives, from the base station apparatus, a first demodulation reference signal and a second demodulation reference signal that are reference signals used to demodulate a data signal, the data signal, and control information; and
a radio signal detector that demodulates the data signal by using the first demodulation reference signal and the second demodulation reference signal, wherein
the control information includes parameters regarding the first demodulation reference signal and parameters regarding the second demodulation reference signal,
the parameters regarding the first demodulation reference signal include information for deriving an antenna port index,
the parameters regarding the second demodulation reference signal include information for deriving an antenna port index, and a time domain density or a frequency domain density with which demodulation reference signals are mapped into a minislot,
the first demodulation reference signal is mapped before the second demodulation reference signal in the minislot, and the first demodulation reference signal is mapped in a fixed mapping pattern for each carrier frequency range, and wherein
a time duration length of the minislot is one of 2, 4, or 7 OFDM symbols, and a first mapping pattern of the first demodulation reference signal and a second mapping pattern of the second demodulation reference signal are different.

5. The terminal apparatus according to claim 4,
wherein a spatial multiplexing order supported for the first demodulation reference signal is lower than a spatial multiplexing order supported for the second demodulation reference signal.

6. The terminal apparatus according to claim 4,
wherein the first demodulation reference signal is mapped to all subcarriers of the minislot in one of the carrier frequency ranges.

7. A communication method in a base station apparatus for communicating with a terminal apparatus, the communication method comprising:
a downlink reference signal generation step of generating a first demodulation reference signal and a second demodulation reference signal that are reference signals used to demodulate a data signal; and
a radio transmission step of transmitting the first demodulation reference signal, the second demodulation reference signal, and control information to the terminal apparatus, wherein
the control information includes parameters regarding the first demodulation reference signal and parameters regarding the second demodulation reference signal,
the parameters regarding the first demodulation reference signal include information for deriving an antenna port index,
the parameters regarding the second demodulation reference signal include information for deriving an antenna port index, and a time domain density or a frequency domain density with which demodulation reference signals are mapped into a minislot,
the first demodulation reference signal is mapped before the second demodulation reference signal in the minislot, and the first demodulation reference signal is mapped in a fixed mapping pattern for each carrier frequency range, and wherein
a time duration length of the minislot is one of 2, 4, or 7 OFDM symbols, and a first mapping pattern of the first demodulation reference signal and a second mapping pattern of the second demodulation reference signal are different.

8. A communication method in a terminal apparatus for communicating with a base station apparatus, the communication method comprising:
a radio receiving step of receiving, from the base station, a first demodulation reference signal and a second demodulation reference signal that are reference signals used to demodulate a data signal, the data signal, and control information; and
a signal detection step of demodulating the data signal by using the first demodulation reference signal and the second demodulation reference signal, wherein
the control information includes parameters regarding the first demodulation reference signal and parameters regarding the second demodulation reference signal,
the parameters regarding the first demodulation reference signal include information for deriving an antenna port index,
the parameters regarding the second demodulation reference signal include information for deriving an antenna port index, and a time domain density or a frequency domain density with which demodulation reference signals are mapped into a minislot,
the first demodulation reference signal is mapped before the second demodulation reference signal in the minislot, and the first demodulation reference signal is mapped in a fixed mapping pattern for each carrier frequency range, and wherein
a time duration length of the minislot is one of 2, 4, or 7 OFDM symbols, and a first mapping pattern of the first demodulation reference signal and a second mapping pattern of the second demodulation reference signal are different.

* * * * *